(12) United States Patent
Kurabuchi

(10) Patent No.: US 11,997,368 B2
(45) Date of Patent: May 28, 2024

(54) VIDEO DISTRIBUTION SYSTEM, VIDEO DISTRIBUTION METHOD, AND STORAGE MEDIUM STORING VIDEO DISTRIBUTION PROGRAM

(71) Applicant: GREE, INC., Tokyo (JP)

(72) Inventor: Aya Kurabuchi, Tokyo (JP)

(73) Assignee: GREE INC., Tokyo (JP)

( * ) Notice: Subject to any disclaimer, the term of this patent is extended or adjusted under 35 U.S.C. 154(b) by 297 days.

(21) Appl. No.: 17/413,457

(22) PCT Filed: Dec. 4, 2019

(86) PCT No.: PCT/JP2019/047384
§ 371 (c)(1),
(2) Date: Jun. 11, 2021

(87) PCT Pub. No.: WO2020/121909
PCT Pub. Date: Jun. 18, 2020

(65) Prior Publication Data
US 2022/0060800 A1    Feb. 24, 2022

(30) Foreign Application Priority Data

Dec. 12, 2018  (JP) ................................. 2018-232307
Mar. 26, 2019  (JP) ................................. 2019-058027
Jul. 1, 2019   (JP) ................................. 2019-122907

(51) Int. Cl.
*H04N 5/265* (2006.01)
*G06F 3/04842* (2022.01)
(Continued)

(52) U.S. Cl.
CPC ....... *H04N 21/816* (2013.01); *G06F 3/04842* (2013.01); *G06V 40/165* (2022.01);
(Continued)

(58) Field of Classification Search
CPC ......... H04N 5/265; H04N 21/816; H04N 7/15
See application file for complete search history.

(56) References Cited

U.S. PATENT DOCUMENTS

2014/0108568 A1*  4/2014  Lee ..................... H04L 65/4015
                                                         709/227
2014/0330649 A1* 11/2014  Lyren .................... G06Q 50/01
                                                         705/14.66
(Continued)

FOREIGN PATENT DOCUMENTS

JP    2012-120098 A    6/2012
JP    2015-184689 A   10/2015
JP         6420930 B    7/2018

OTHER PUBLICATIONS

Hasegawa Yusuke, Beginning of New Ear of Virtual Idle Project Mari A, CG World, Japan, Bone Digital Co., Ltd., Nov. 10, 2017, vol. 231, pp. 74-79, relevance disclosed in specification at paragraph [0002].

(Continued)

*Primary Examiner* — Yi Yang
(74) *Attorney, Agent, or Firm* — Pillsbury Winthrop Shaw Pittman, LLP

(57) ABSTRACT

One embodiment of the invention includes one or more computer processors executing computer-readable instructions to: distribute a co-performing video including a first character object generated based on motions of a first user and a second character object generated based on motions of a second user; in response to reception of a first display request for a first gift from a viewer user viewing the co-performing video, display a display instruction object on at least one of a first user device used by the first user and a second user device used by the second user; and in response to an operation on the display instruction object, display the first gift in association with at least one of the (Continued)

first character object and the second character object in the co-performing video.

16 Claims, 21 Drawing Sheets

(51) Int. Cl.
```
G06V 40/16      (2022.01)
G06V 40/20      (2022.01)
H04N 7/15       (2006.01)
H04N 21/478     (2011.01)
H04N 21/4788    (2011.01)
H04N 21/81      (2011.01)
```

(52) U.S. Cl.
CPC ......... *G06V 40/20* (2022.01); *H04N 21/4781* (2013.01); *H04N 21/4788* (2013.01); *H04N 21/8146* (2013.01)

(56) References Cited

U.S. PATENT DOCUMENTS

| | | | | |
|---|---|---|---|---|
| 2016/0048900 A1* | 2/2016 | Shuman | ............. | G06Q 30/0204 705/7.33 |
| 2016/0381427 A1* | 12/2016 | Taylor | ................. | H04N 21/472 725/13 |
| 2017/0032577 A1* | 2/2017 | Smith | ..................... | G06F 3/017 |
| 2017/0195631 A1* | 7/2017 | Cahill | .................... | H04N 7/152 |
| 2017/0201779 A1* | 7/2017 | Publicover | .......... | G06F 16/2358 |
| 2018/0075419 A1* | 3/2018 | Just | ........................ | G06Q 20/40 |
| 2019/0036856 A1* | 1/2019 | Bergenlid | ................ | H04N 7/15 |
| 2019/0250934 A1* | 8/2019 | Kim | ....................... | G06V 40/28 |
| 2019/0366210 A1* | 12/2019 | Beltran | ................. | A63F 13/352 |

OTHER PUBLICATIONS

"Virtual Cast what is Totsu"_nicovideo [online, searched on Nov. 25, 2018], the internet URL : https://qa.nicovideo.jp/faq/show/10740?back=front%2Fcategory%3Ashow&category_id=718&page=1&, 4 pgs., with partial English translation.

Notice of Reasons for Refusal dated Jan. 29, 2019, issued in corresponding Japanese Patent Application No. JP 2018-232307 with English translation (14 pgs.).

"Thorough commentary! What is a 'virtual cast' that anyone can become a VTuber?", [online], Apr. 21, 2018, [retrieved on Jan. 17, 2019], entire text, 14 pgs., relevance disclosed in International Search Report, Internet<URL: https://www.moguravr.com/virtualcast-2/>.

Search Report dated Feb. 4, 2020, issued in corresponding International Application No. PCT/JP2019/047384 with English translation (5 pgs.).

Written Opinion of the International Searching Authority dated Feb. 4, 2020, issued in corresponding International Application No. PCT/JP2019/047384 with English translation (8 pgs.).

Notice of Reasons for Refusal dated Dec. 5, 2023, issued in corresponding Japanese Patent Application No. 2022-195349 with English translation (10 pgs.).

* cited by examiner

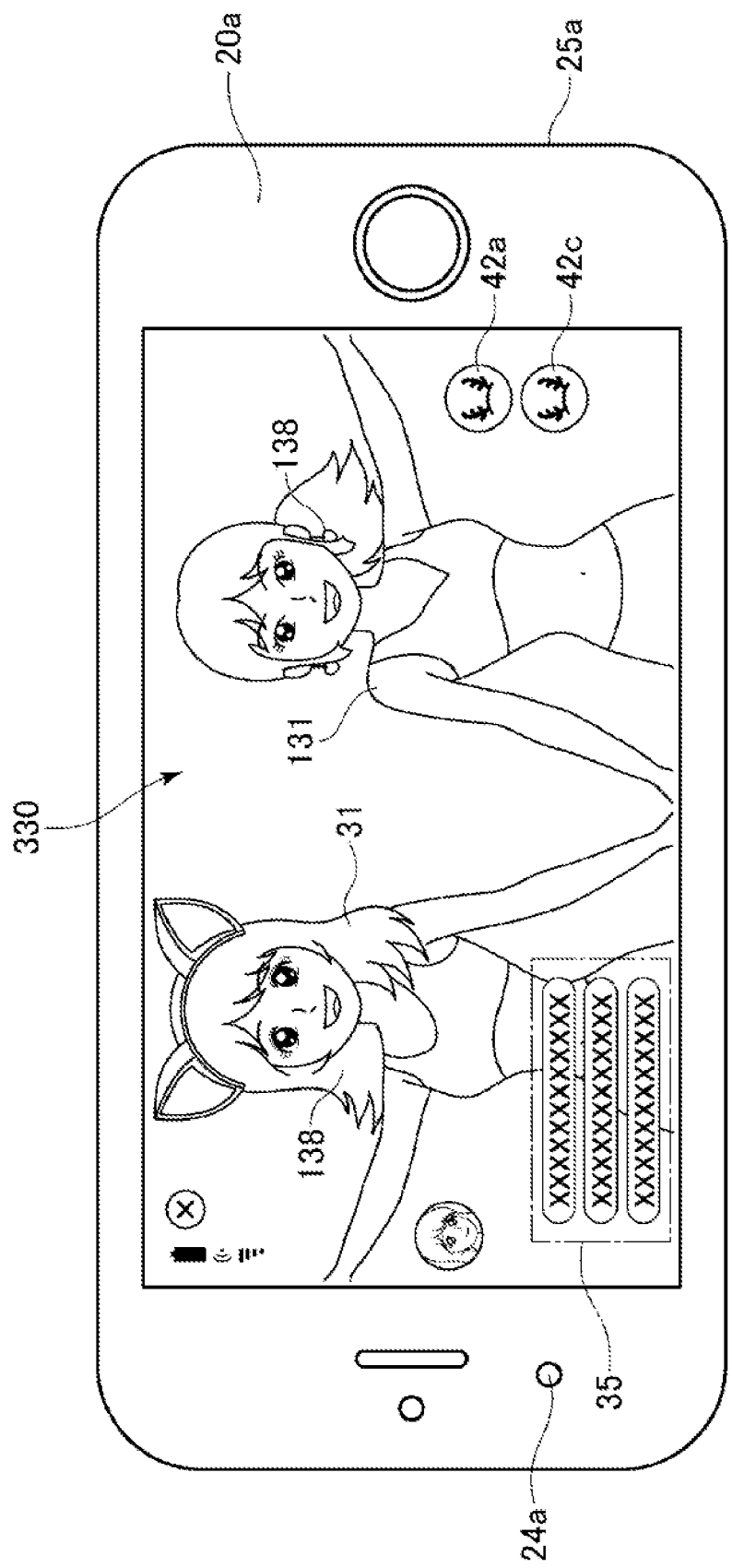

VIDEO DISTRIBUTION SYSTEM, VIDEO DISTRIBUTION METHOD, AND STORAGE MEDIUM STORING VIDEO DISTRIBUTION PROGRAM

CROSS-REFERENCE TO RELATED APPLICATIONS

This application is based on and claims the benefit of priority to International Application No. PCT/JP2019/047384 (filed on Dec. 4, 2019), which claims priority to Japanese Patent Application No. 2018-232307 (filed on Dec. 12, 2018), Japanese Patent Application No. 2019-058027 (filed on Mar. 26, 2019), and Japanese Patent Application No. 2019-122907 (filed on Jul. 1, 2019), the contents of each of which are incorporated herein by reference in their entirety.

TECHNICAL FIELD

The present disclosure relates to a video distribution system, a video distribution method, and a storage medium storing a video distribution program. Specifically, the present disclosure relates to a system, method, and non-transitory computer-readable storage medium storing a program, for live distributing a video containing a character object generated based on motion of a user.

BACKGROUND

Video distribution systems that generate an animation of a character object based on motion of a distributor user and live distribute a video including the animation of the character object have been known. Such a video distribution system is disclosed, for example, in Japanese Patent Application Publication 2015-184689 (Patent Literature 1) and "Hasegawa Yusuke, Beginning of New Ear of Virtual Idle PROJECT Mari A, CG WORLD, Japan, Bone Digital Co., Ltd., Nov. 10, 2017, Vol. 231, pp. 74-79"(Non-Patent Literature 1).

A video distribution service for live distributing a video containing a character object generated based on motion of a distributor user is provided. As such a service, "Virtual Case" provided by DWANGO Co., Ltd. is known. In Virtual Cast, a character object of a user is able to enter a video distributed by another distributor user, and the two distributor users can virtually appear together in the video through each character object.

Also known are content distribution systems that receive a request from a viewer user who is viewing contents, and in response to the request, display a gift object corresponding to a gift purchased by the viewer user in a view on a screen. For example, in the video distribution system disclosed in Japanese Patent Application Publication No. 2012-120098 (Patent Literature 2), a viewer user can purchase a gift item and provide the purchased gift item to a distributor user as a gift. The gift is displayed in a video in response to a display request from the viewer user. A display request to display a gift may also automatically generated in response to purchase of the gift by a viewer user.

RELEVANT REFERENCES

List of Relevant Patent Literature
Patent Literature 1: Japanese Patent Application Publication No. 2015-184689

Patent Literature 2: Japanese Patent Application Publication No. 2012-120098

List of Relevant Non-Patent Literature
Non-Patent Literature 1: Hasegawa Yusuke, Beginning of New Ear of Virtual Idle PROJECT Mari A, CG WORLD, Japan, Bone Digital Co., Ltd., Nov. 10, 2017, Vol. 231, pp. 74-79., Ltd., Nov. 10, 2017, Vol. 231, pp. 74-79."

Non-Patent Literature 2: DWANGO Co., Ltd. Virtual Cast, "About Totsu," [online], [retrieved on Nov. 25, 2018], Internet <URL: https://qa.nicovideo.jp/faq/show/10740?back=front % 2Fcategory % 3Ashow & category_id=718 & page=1 & site_domain=default & sort=sort_access & sort_order=desc>

SUMMARY

In a conventional video distribution system, gifts are provided from viewer users to distributor users. When two or more distributor users appear together in a same video and each of the distributor users receives gifts from viewer users in this co-performing video, the number of the gifts received in the video will be larger than the case where each distributor user separately distributes their own video. In addition, when received gifts are displayed in the co-performing video, the view of the video may be cluttered with gifts provided to each distributor user, and the quality of the distributed video cannot be maintained.

It is an object of the present disclosure to provide a technical improvement which solves or alleviates at least part of the drawbacks of the prior art mentioned above. Specifically, one object of the disclosure is to provide a system, method, and non-transitory computer-readable storage medium storing a program for video distribution with which gifts from viewer users can be displayed in a co-performing video in an orderly manner.

According to one aspect of the invention, a video distribution system includes one or more computer processors. The one or more computer processors execute computer-readable instructions to: distribute a co-performing video including a first character object generated based on motions of a first user and a second character object generated based on motions of a second user; in response to reception of a first display request for a first gift from a viewer user viewing the co-performing video, display a display instruction object on at least one of a first user device used by the first user and a second user device used by the second user; and in response to an operation on the display instruction object, display the first gift in association with at least one of the first character object and the second character object in the co-performing video. The first gift may be displayed in association with only one of the first character object and the second character object in the co-performing video.

In the video distribution system in one embodiment, the display instruction object is displayed on both of the first user device and the second user device, and the display instruction object is made unselectable from the second user device when the display instruction object has been operated in the first user device, and the display instruction object is made unselectable from the first user device when the display instruction object has been operated in the second user device.

In the video distribution system in one embodiment, the first display request includes user specifying information specifying either the first user or the second user. In the video distribution system in this embodiment, when the first user is specified by the user specifying information, the display instruction object is made selectable on the first user device and the display instruction object is made unselectable on the second user device, whereas when the second user is specified by the user specifying information, the display instruction object is made selectable on the second user device and the display instruction object is made unselectable on the first user device.

In the video distribution system in one embodiment, the display instruction object is made selectable on the first user device, and the display instruction object is made unselectable in the second user device.

In the video distribution system in one embodiment, in response to an operation on the display instruction object on the first user device, the first gift is displayed in association with the second character object in the co-performing video.

In the video distribution system in one embodiment, the first gift is a wear gift associated with a worn-on portion of the first character object and the second character object, and the wear gift is displayed in the co-performing video at a position corresponding to the worn-on portion in response to the operation on the display instruction object.

In the video distribution system in one embodiment, a second gift is displayed in the co-performing video in response to reception of a second display request from the viewer user for the second gift that is displayed without being associated with a specific portion of the first character object and the second character object.

In the video distribution system in one embodiment, the co-performing video is generated based on a co-performing request from the second user.

In the video distribution system in one embodiment, in response to reception of the first display request for the first gift from a viewer user viewing a non-co-performing video that includes the first character object but does not include the second character object, the first gift is displayed in association with the first character object even without the operation on the display instruction object.

In the video distribution system in one embodiment, a game start button for starting a game is displayed on the first user device when a non-co-performing video that includes the first character object but does not include the second character object is distributed, and the game start button is made unselectable on the first user device when the co-performing video is distributed.

Another aspect of the invention relates to a method of distributing a video performed by executing computer readable instructions by one or more computer processor. The method includes: distributing a co-performing video including a first character object generated based on motions of a first user and a second character object generated based on motions of a second user; in response to reception of a first display request for a first gift from a viewer user viewing the co-performing video, displaying a display instruction object on at least one of a first user device used by the first user and a second user device used by the second user; and in response to an operation on the display instruction object, displaying the first gift in association with at least one of the first character object and the second character object in the co-performing video.

Yet another aspect of the invention relates to a non-transitory computer-readable storage medium storing a video distribution program. The video distribution program causes one or more computer processors to: distribute a co-performing video including a first character object generated based on motions of a first user and a second character object generated based on motions of a second user; in response to reception of a first display request for a first gift from a viewer user viewing the co-performing video, display a display instruction object on at least one of a first user device used by the first user and a second user device used by the second user; and in response to an operation on the display instruction object, display the first gift in association with at least one of the first character object and the second character object in the co-performing video.

ADVANTAGEOUS EFFECTS

According to the aspects of the invention, it is possible to display gifts from viewer users in an orderly manner in a co-performing video.

BRIEF DESCRIPTION OF THE DRAWINGS

FIG. 13A illustrates an example of a view of the co-performing video displayed on the distributor user device 20a in one embodiment. In the view of FIG. 13A, the character object 131 wears the wear object 138.

DESCRIPTION OF THE EMBODIMENTS

Figure 1:
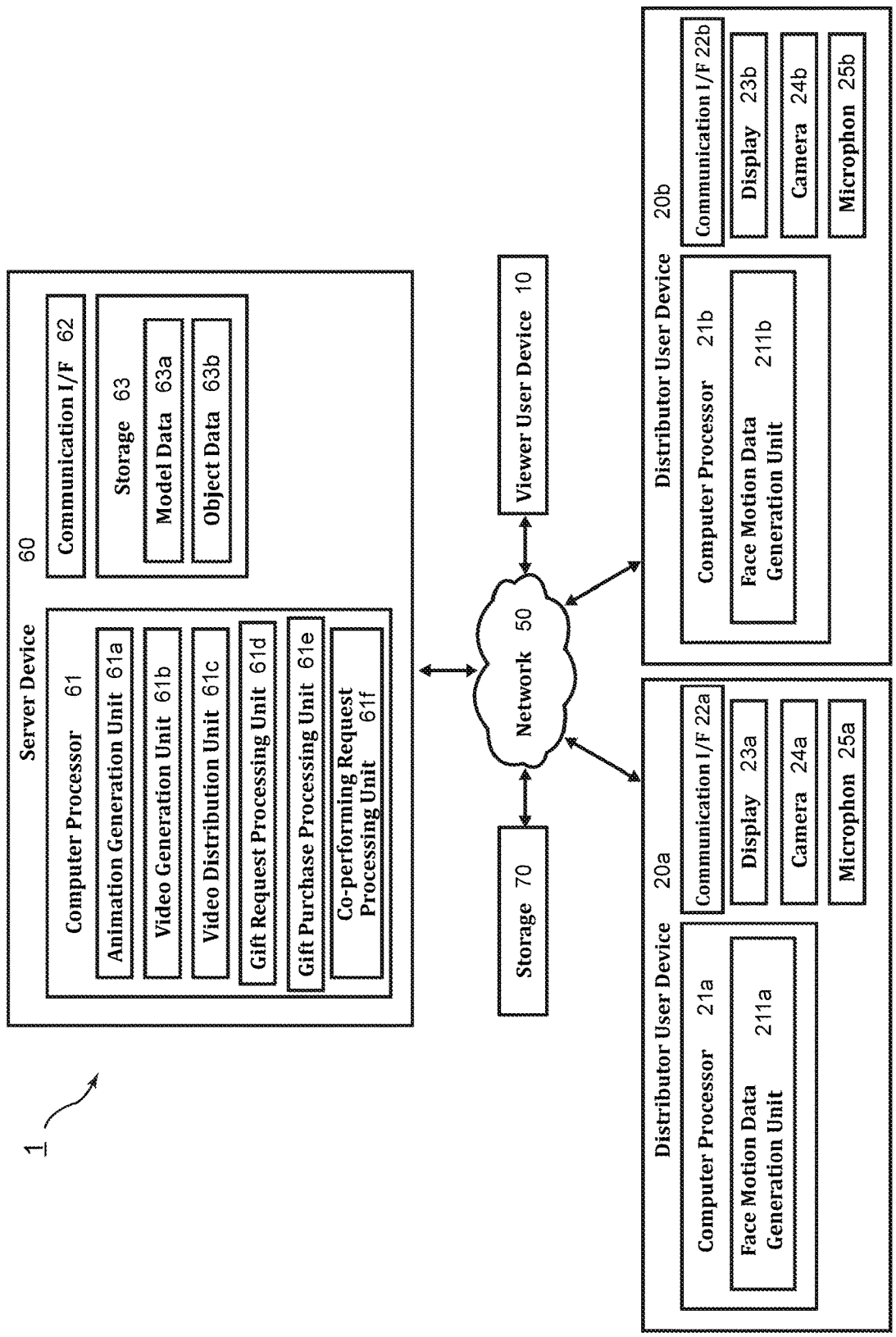
FIG. 1 is a block diagram illustrating a video distribution system in one embodiment.

Various embodiments of the disclosure will be described hereinafter with reference to the accompanying drawings. Throughout the drawings, the same or similar elements are denoted by the same reference numerals.

Figure 2:
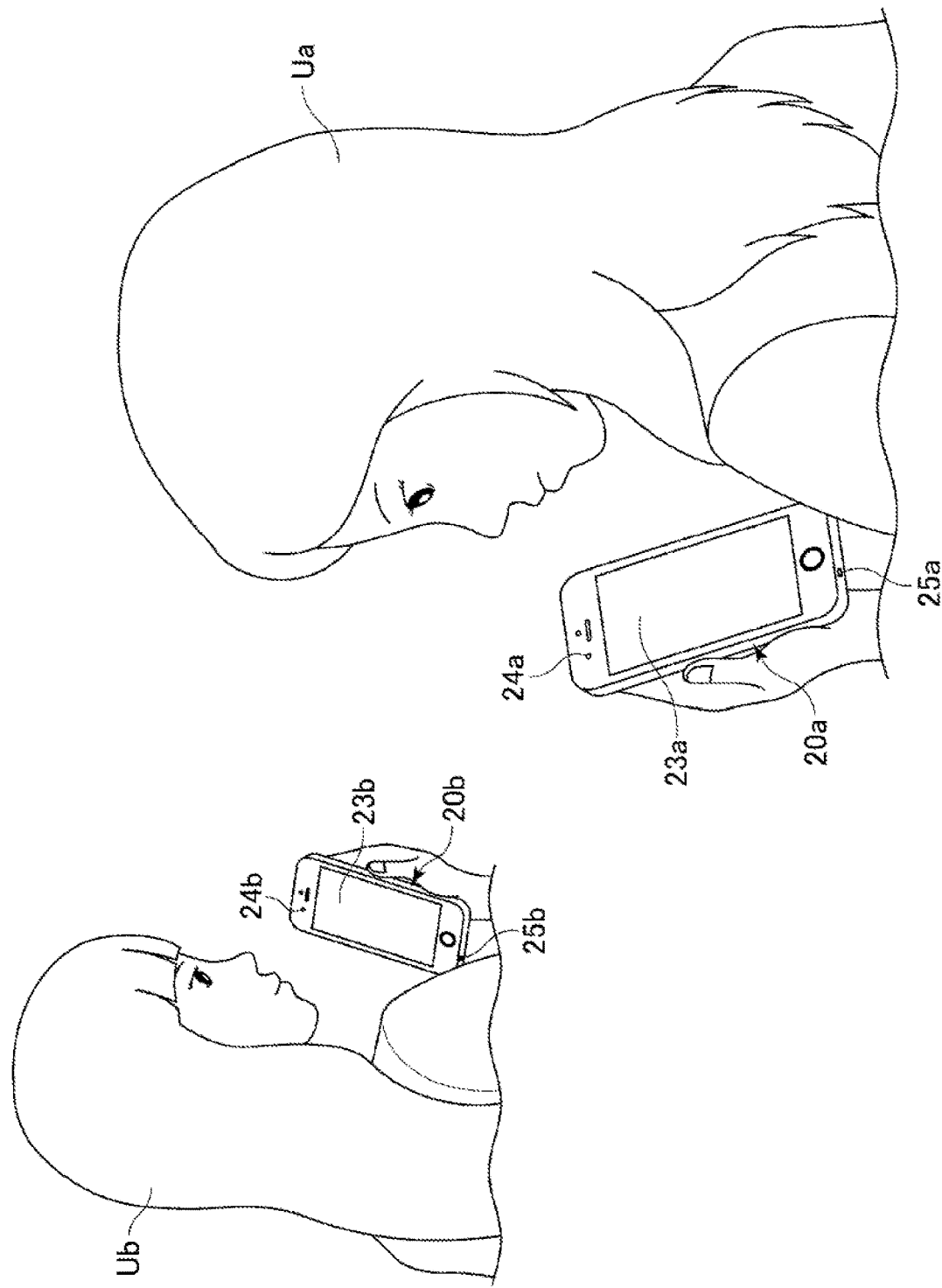
FIG. 2 schematically illustrates a distributor user who distributes a video in the video distribution system of FIG. 1 and a distributor user device that the distributor user uses.

With reference to FIGS. 1 to 2, a video distribution system in one embodiment will be described. FIG. 1 is a block diagram illustrating a video distribution system 1 in one embodiment, and FIG. 2 schematically illustrates distributor users Ua and Ub who distribute a video in the video distribution system of FIG. 1 and distributor user devices 20a and 20b that the distributor users Ua and Ub use. The distributor user devices 20a and 20b may have a viewing feature to view a video distributed by the video distribution system 1.

The video distribution system 1 includes a viewer user device 10, the distributor user device 20a and 20b, a server device 60, and a storage 70. The viewer user device 10, the distributor user device 20, the server device 60, and the storage 70 are communicably interconnected over a network 50. The server device 60 is configured to distribute a video including animations of characters of the distributor users Ua and Ub as described later.

The video is distributed from the server device 60 to the viewer user device 10 and the distributor user devices 20a and 20b. The distributed video is displayed on a display of the viewer user device 10. A viewer user who is a user of the viewer user device 10 is able to view the distributed video on the viewer user device. Although only the single viewer user device 10 is shown in FIG. 1 to simplify the drawing, the video distribution system 1 may include two or more viewer user devices. The distributor users Ua and Ub are able to perform while checking moving images in the video by viewing the distributed video.

In the illustrated embodiment, the distributor user device 20a includes a computer processor 21a, a communication I/F 22a, a display 23a, a camera 24a, and a microphone 25a. Similarly, the distributor user device 20b includes a computer processor 21b, a communication I/F 22b, a display 23b, a camera 24b, and a microphone 25b. Since the distributor user device 20a and the distributor user device 20b have similar configurations and functions, they may be referred to collectively as the distributor user device 20 when there is no particular need to distinguish between them, and their components may also be collectively referred to as, for example, the computer processor 21, etc.

The computer processor 21 is a computing device which loads various programs realizing an operating system and various functions from the storage into a memory unit and executes instructions included in the loaded programs. The computer processor 21 is, for example, a CPU, an MPU, a DSP, a GPU, any other computing device, or a combination thereof. The computer processor 21 may be realized by means of an integrated circuit such as ASIC, PLD, FPGA, MCU, or the like. Although the computer processor 21 is illustrated as a single component in FIG. 1, the computer processor 21 may be a collection of a plurality of physically separate computer processors.

The communication I/F 22 may be implemented as hardware, firmware, or communication software such as a TCP/IP driver or a PPP driver, or a combination thereof. The distributor user device 20 is able to transmit and receive data to and from other devices via the communication I/F 22.

The display 23 includes a display panel and a touch-screen panel. The touch-screen panel is configured to detect touch interactions (touch operations) performed by a user. The touch-screen panel is capable of detecting various touch operations such as tapping, double tapping, and dragging performed by the user. The touch-screen panel may include a capacitive proximity sensor and may be capable of detecting a non-contact operation performed by the user.

The camera 24 continuously captures images of faces of the distributor users Ua and Ub to obtain imaging data of the faces of the distributor users Ua and Ub. The imaging data of the faces of the distributor users Ua and Ub captured by the camera 24 is transmitted to the server device 60 via the communication I/F 22. The the camera 24 may be 3D cameras capable of detecting the depth of a face of a person.

The microphone 25 is a sound collector configured to convert voice inputted thereto into voice data. The microphone 25 is capable of obtaining a voice input of the distributor users Ua and Ub. The voice input of the distributor users Ua, Ub obtained by the microphone 25 is converted into voice data, and the voice data is transmitted to the server device 60 via the communication I/F 22.

The viewer user device 10 may include the same components as the distributor user device 20. For example, the viewer user device 10 may include a computer processor, a communication I/F, a display, and a camera. The viewer user device 10 may perform the same functions as the distributor user device 20 by downloading and installing a prescribed application software.

The viewer user device 10 and the distributor user device 20 are information processing devices such as smartphones. In addition to the smartphones, the viewer user device 10 and the distributor user device 20 may be mobile phones, tablets, personal computers, electronic book readers, wearable computers, game consoles, or any other information processing devices that are capable of reproducing a video. The viewer user device 10 and the distributor user device 20 may each include a sensor unit including various sensors such as a gyro sensor and a storage for storing various information in addition to the above-mentioned components.

Next, a description is given of the server device 60. In the illustrated embodiment, the server device 60 includes a computer processor 61, a communication I/F 62, and a storage 63.

The computer processor 61 is a computing device which loads various programs realizing an operating system and various functions from the storage 63 or other storage into a memory unit and executes instructions included in the loaded programs. The computer processor 61 is, for example, a CPU, an MPU, a DSP, a GPU, any other computing device, or a combination thereof. The computer processor 61 may be realized by means of an integrated circuit such as ASIC, PLD, FPGA, MCU, or the like. Although the computer processor 61 is illustrated as a single component in FIG. 1, the computer processor 61 may be a collection of a plurality of physically separate computer processors.

The communication I/F 62 may be implemented as hardware, firmware, or communication software such as a TCP/IP driver or a PPP driver, or a combination thereof. The server device 60 is able to transmit and receive data to and from other devices via the communication I/F 62.

The storage 63 is a storage device accessed by the computer processor 61. The storage 63 is, for example, a magnetic disk, an optical disk, a semiconductor memory, or various other storage devices capable of storing data. Various programs may be stored in the storage 63. At least some of the programs and various data that may be stored in the storage 63 may be stored in a storage (for example, a storage 70) that is physically separated from the server device 60.

In this specification, a program or instructions included in the program that are described as being executed by the computer processor 21 or the computer processor 61 may be executed by a single computer processor or executed by a plurality of computer processors distributively. Further, a program or instructions included in the program executed by the computer processor 21 or the computer processor 61 may be executed by a plurality of virtual computer processors.

Next, data stored in the storage 63 will be described. In the illustrated embodiment, the storage 63 stores model data 63*a*, object data 63*b*, and any other data required for generation and distribution of a video to be distributed.

The model data 63*a* is model data for generating animation of a character. The model data 63*a* may be three-dimensional model data for generating three-dimensional animation, or may be two-dimensional model data for generating two-dimensional animation. The model data 23*a* includes, for example, rig data (also referred to as "skeleton data") indicating a skeleton of a face and a skeleton of body parts other than the face of a character, and surface data indicating the shape or texture of surfaces of the character. The model data 63*a* may include two or more different pieces of model data. The pieces of model data may each have different rig data, or may have the same rig data. The pieces of model data may have different surface data or may have the same surface data.

The object data 63*b* includes asset data used for constructing a virtual space in the video. The object data 63*b* includes data for rendering a background of the virtual space in the video, data for rendering various objects displayed in the video, and data for rendering any other objects displayed in the video. The object data 63*b* may include object position information indicating the position of an object in the virtual space.

In addition to the above, the object data 63*b* may include a gift object. The gift object is displayed in a video in response to a display request from a viewer user who watches the video. The gift object may include an effect object corresponding to an effect gift, a normal object corresponding to a normal gift, a wear object corresponding to a wear gift, and a message object corresponding to a message gift. Viewer users are able to purchase a desired gift(s). The distinction between the viewer user and the distributor user (e.g., the distributor users Ua and Ub) is a distinction that focuses on actions of the users. For example, in the video distribution system 1, when a user is viewing a video, the user is called the viewer user, but when the user is distributing a video, the user is called the distributor user.

The effect object representing the effect gift is an object that affects the impression of the entire viewing screen of the distributed video, and is, for example, an object representing confetti. The object representing confetti may be displayed on the entire viewing screen, which can change the impression of the entire viewing screen. The effect object may be displayed so as to overlap with the character object, but it is different from the wear object in that it is displayed without any association with a specific portion of the character object.

The normal object is an object representing a gift from a viewer user to a distributor user (for example, the distributor users Ua and Ub), for example, an object representing a stuffed toy, a bouquet, an accessory, or any other gift or something suitable as a present. In one embodiment, the normal object is displayed on the view of the video such that it does not contact the character object. In one embodiment, the normal object is displayed on the view of the video such that it does not overlap with the character object. The normal object may be displayed in the virtual space such that it overlaps with an object other than the character object. The normal object may be displayed so as to overlap with the character object, but it is different from the wear object in that it is not displayed in association with a specific portion of the character object. In one embodiment, when the normal object is displayed such that it overlaps with the character object, the normal object may hide portions of the character object other than the head including the face of the character object but does not hide the head of the character object. In one embodiment, when the normal object is displayed such that it overlaps with the character object, the normal object may hide portion(s) of the character object other than its upper body but does not hide the upper body of the character object including the face of the character object.

The wear object is an object displayed on the view in association with a specific portion (worn-on portion) of the body of the character object. In one embodiment, the wear object displayed on the view in association with a specific portion of the character object is displayed adjacent to the specific portion of the character object on the view. In one embodiment, the wear object displayed on the view in association with a specific portion of the character object is displayed such that it partially or entirely covers the specific portion of the character object on the view. The specific part may be specified by three-dimensional position information that indicates a position in a three-dimensional coordinate space, or the specific portion may be associated with position information in the three-dimensional coordinate space. For example, a specific portion in the head of a character may be specified in the units of the front left side, the front right side, the rear left side, the rear right side, the middle front side, and the middle rear side of the head, the left eye, the right eye, the left ear, the right ear, and the whole hair.

The wear object is an object that can be attached to a character object, for example, an accessory (such as a headband, a necklace, an earring, etc.), clothes (such as a T-shirt), a costume, and any other object which can be worn by the character object. The object data 63*b* corresponding to the wear object may include worn-on portion information indicating which body portion of the character object the wear object is associated with. The worn-on portion information of a wear object may indicate on which body part of the character object the wear object is worn. For example, when the wear object is a headband, the worn-on portion information of the wear object may indicate that the wear object is worn on the "head" of the character object. When the worn-on portion of a wear object is specified as a position in a three-dimensional coordinate space, the worn-on portion information may be associated with two or more positions in the three-dimensional coordinate space. For example, the worn-on portion information that indicates the position to which a wear object representing "a headband" is worn may be associated with two portions: "the rear left side of the head" and "the rear right side of the head" of the character object. In other words, the wear object representing the "headband" may be worn on both "the rear left side of the head" and "the rear right side of the head." When the wear object is a T-shirt, the worn-on portion information of the wear object may indicate that the wear object is worn on the "torso" of the character object.

Two different wear objects having a common worn-on portion are displayed at different time in the video. That is, the two different wear objects having the common worn-on portion are worn by the character object at different timing. In other words, the two different objects having the common worn-on portion are not simultaneously worn by the character object. For example, when the "head" is set as the worn-on body portion for a wear object representing a headband and a wear object representing a hat, the wear object representing the headband and the wear object representing the hat are not simultaneously displayed.

A duration of time of displaying a gift object may be set depending on its type. In one embodiment, the duration of displaying or display time of the wear object may be set longer than the display time of the effect object and the display time of the normal object. For example, the duration of displaying the wear object may be set to 60 seconds, while the duration of displaying the effect object may be set to five seconds, and the duration of displaying the normal object may be set to ten seconds.

Functions realized by the computer processors 21a and 21b will be now described more specifically. The computer processor 21a functions as a face motion data generation unit 211a by executing computer-readable instructions included in a distribution program. Similarly, the computer processor 21b functions as a face motion data generation unit 211b by executing computer-readable instructions included in a distribution program. At least some of the functions that can be realized by the computer processors 21a, 21b may be realized by a computer processor other than the computer processors 21a, 21b of the video distribution system 1. For example, at least some of the functions realized by the computer processors 21a, 21b may be realized by the computer processor 61 mounted on the server device 60.

The face motion data generation unit 211a generates face motion data, which is a digital representation of motion of the face of the distributor user U 1a, based on captured image data of the camera 24a. Similarly, the face motion data generation unit 211b generates face motion data, which is a digital representation of motion of the face of the distributor user Ub, based on captured image data of the camera 24b. The face motion data is serially generated with time as needed. The face motion data may be generated at predetermined sampling time intervals. Thus, the face motion data generated by the face motion data generation unit 211a can digitally represent facial motion (changes in facial expression) of the distributor user Ua, and the face motion data generated by the face motion data generation unit 211b can digitally represent facial motion (changes in facial expression) of the distributor user Ub. The face motion data generated by the face motion data generation unit 211a, 211b is transmitted to the server device 60 via the communication I/Fs 22a, 22b.

In addition to the face motion data generated by the face motion data generation unit 211a, the distributor user device 20 may generate body motion data that is a digital representation of the position and orientation of any body part other than the faces of the distributor users Ua and Ub. The distributor user device 20 may transmit the body motion data to the server device 60 in addition to the face motion data.

In order to generate the body motion data, the distributor users Ua and Ub may each wear a motion sensor. The distributor user device 20 may be capable of generating the body motion data based on detection result information of the motion sensors attached to the distributor users Ua and Ub. The body motion data may be generated at predetermined sampling time intervals. Thus, the body motion data can represent body motion of the distributor users Ua and Ub in time series as digital data. Generation of the body motion data based on the detection result information of the motion sensors attached to the distributor users Ua and Ub may be performed, for example, in a shooting studio. The shooting studio may be provided with a base station, a tracking sensor, and a display. The base station may be a multi-axis laser emitter. The motion sensors attached to the distributor users Ua and Ub may be, for example, Vive Trackers provided by HTC CORPORATION. The base station installed in the shooting studio may be, for example, a base station provided by HTC CORPORATION. In addition, a supporter computer may be provided in a separate room from the shooting studio. The display in the shooting studio may be configured to display information received from the support computer. The server device 60 may be installed in the same room as the room in which the supporter computer is installed. The room where the support computer is installed and the shooting studio may be separated by a glass window. In this case, an operator of the supporter computer (may also be herein referred to as a "supporter") can see the distributor users Ua, Ub. The supporter computer may be capable of changing the setting(s) of the devices installed in the shooting studio according to the operation by the supporter. The supporter computer can change, for example, the setting of a scanning interval performed by the base station, the setting of of the tracking sensor, and various settings of other devices. The supporter is able to input a message to the supporter computer, and the inputted message is displayed on the display in the shooting studio.

The distributor user device 20 may realize a function other than the face motion data generation unit 211a by executing the distribution program and/or any other program on the computer processor. For example, the distributor user device 20 may realize a playing back function for playing a received video by executing a viewing program for watching a video. The distribution program and the viewing program may be packaged as a single application software, or may be provided as separate application software.

The viewer user device 10 may be configured to provide the same functions as the distributor user device 20. For example, the viewer user device 10 may realize the playing back function for playing a received video by executing the viewing program for watching a video, and may realize function similar to the function of the face motion data generation unit 211a by executing the distribution program.

Functions realized by the computer processor 61 will be now described more specifically. The computer processor 61 functions as an animation generation unit 61a, a video generation unit 61b, a video distribution unit 61c, a gift request processing unit 61d, a gift purchase processing unit 61e, and a co-performing request processing unit 61f by executing computer-readable instructions included in the distribution program.

The animation generation unit 61a is configured to apply a face motion data generated by the face motion data generation unit 211a in the distributor user device 20 to predetermined model data included in the model data 63a in order to generate an animation of a character object. The animation generation unit 61a is capable of generating an animation of a character object such that the expression of the character object changes based on the face motion data. More specifically, the animation generation unit 61*a* is capable of generating an animation of a character object whose face moves in synchronization with the facial expression of the distributor user Ua based on the face motion data related to the distributor user Ua. Similarly, the animation generation unit 61*a* is capable of generating an animation of a character object whose face moves in synchronization with the facial expression of the distributor user Ub based on the face motion data related to the distributor user Ub.

When the distributor user device 20 provides body motion data of the distributor users Ua and Ub, the animation generation unit 61*a* is capable of generating animations of character objects whose bodies and faces move in synchronization with the body motion and the facial expressions of the distributor users Ua and Ub based on the body motion data and the face motion data related to the distributor users Ua and Ub.

When a video of the distributor user Ua is distributed, the video generation unit 61*b* may generate a background image representing a background using the object data 63*b*, and may generate a video including the background image and an animation of a character object corresponding to the distributor user Ua. The video generation unit 61*b* is capable of adding a voice of the distributor user Ua produced based on the voice data received from the distributor user device 20*a* to the generated video. Similarly, when a video of the distributor user Ub is distributed, the video generation unit 61*b* may generate a background image representing a background using the object data 63*b*, and may generate a video including the background image and an animation of a character object corresponding to the distributor user Ub. The video generation unit 61*b* may add a voice of the distributor user Ub produced based on the voice data received from the distributor user device 20*b* to the generated video. In the videos generated by the video generation unit 61*b*, the character objects corresponding to the distributor users Ua and Ub are displayed such that they are superimposed on the background images. As described above, the video generation unit 61*b* generates the animation of the character object moving in synchronization with the facial expression of the distributor user Ua or Ub, and generates the video in which the voice of the distributor user Ua or Ub is added to the animation for distribution. A co-performing video including both the character object of the distributor user Ua and the character object of the distributor user Ub will be described later.

The video distribution unit 61*c* distributes the video generated by the video generation unit 61*b*. The video is distributed to the viewer user device 10 and other viewer user devices over the network 50. The generated video is also distributed to the distributor user devices 20*a* and 20*b*. The distributed video is played on the viewer user device 10 and the distributor user devices 20*a* and 20*b*.

Figure 3:
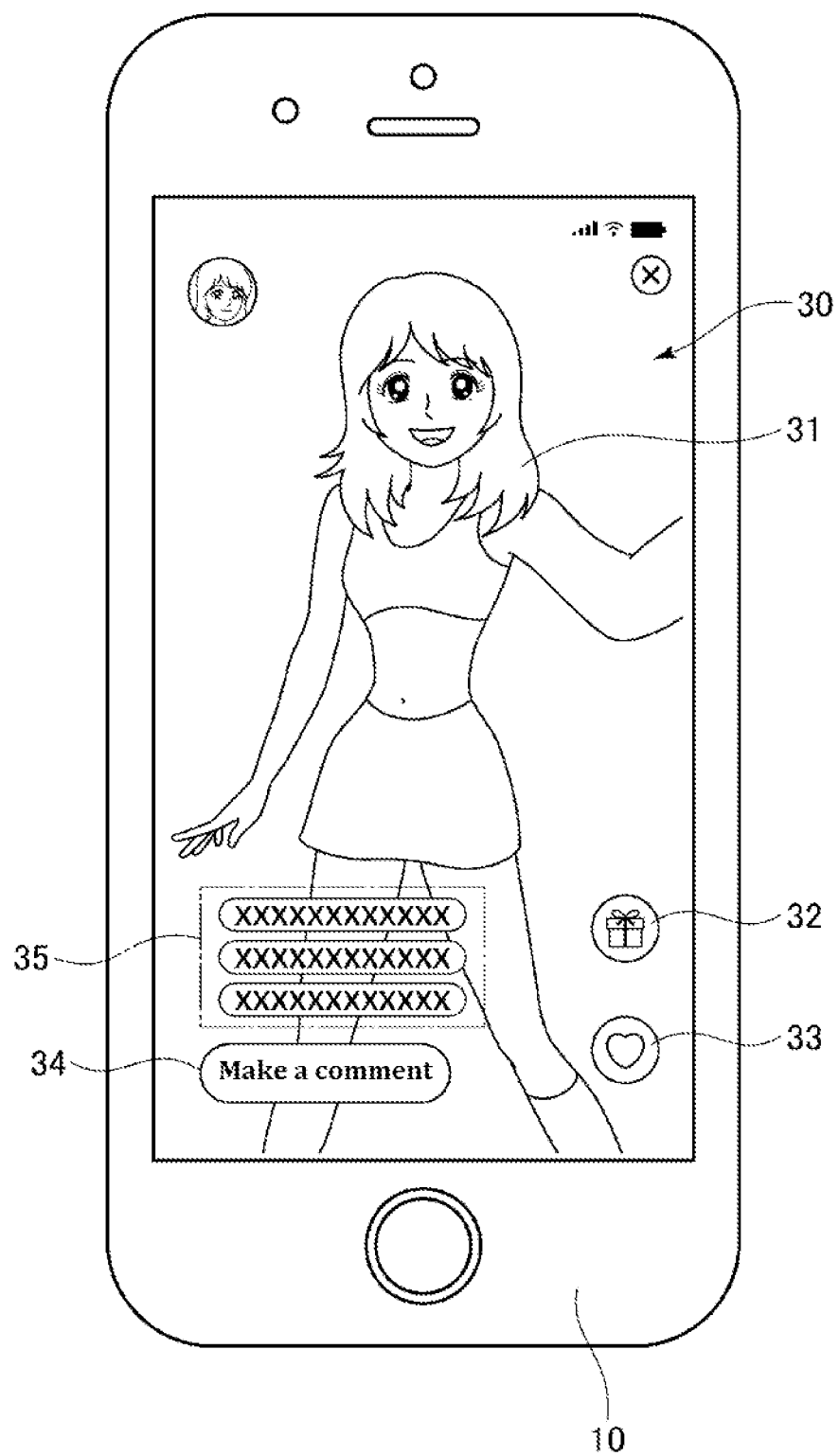
FIG. 3 illustrates an example of a view on a screen of a viewer user device 10 in one embodiment.
Figure 4A:
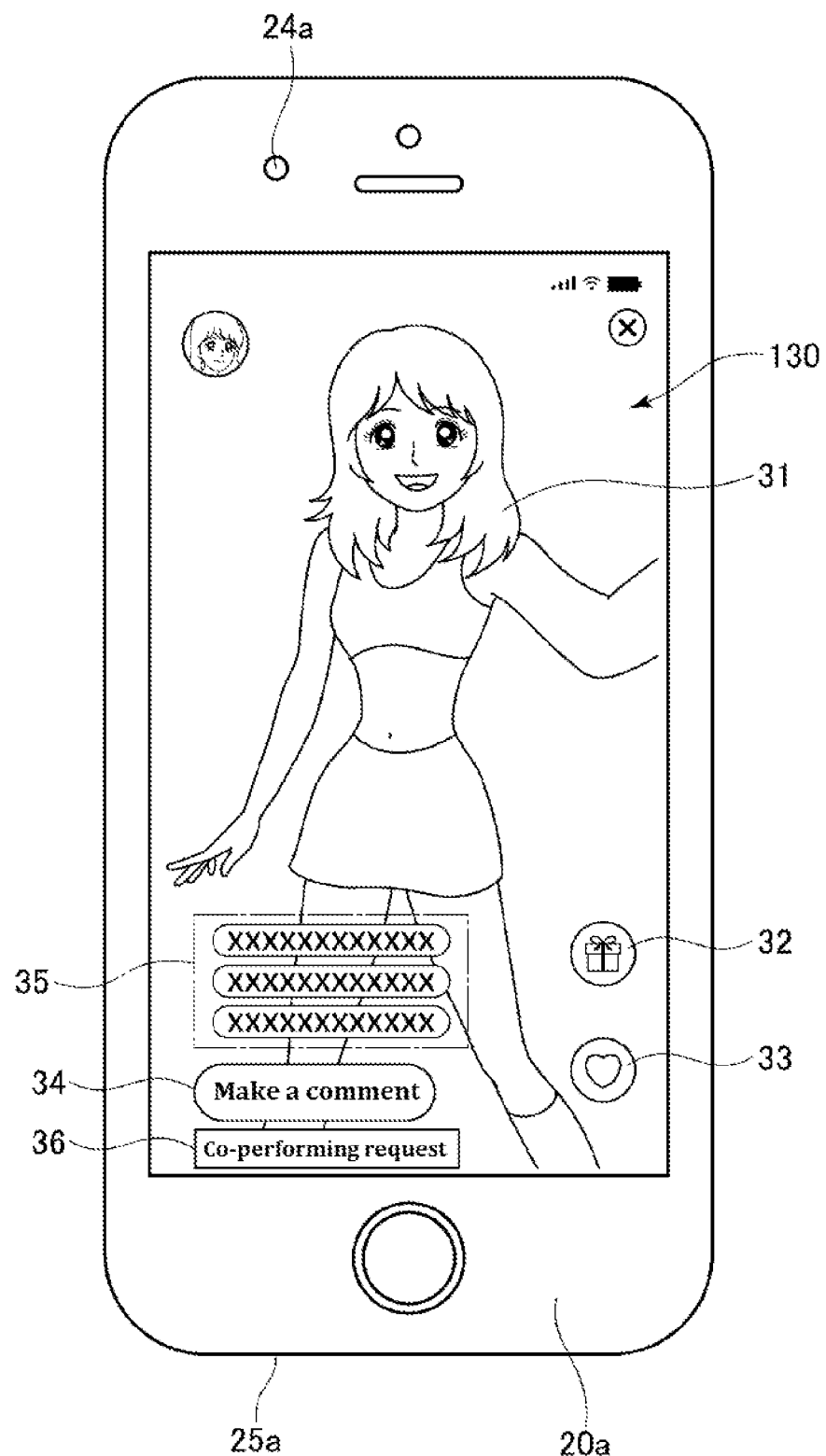
FIG. 4A illustrates an example of a view on a screen of a distributor user device 20a in one embodiment.
Figure 4B:
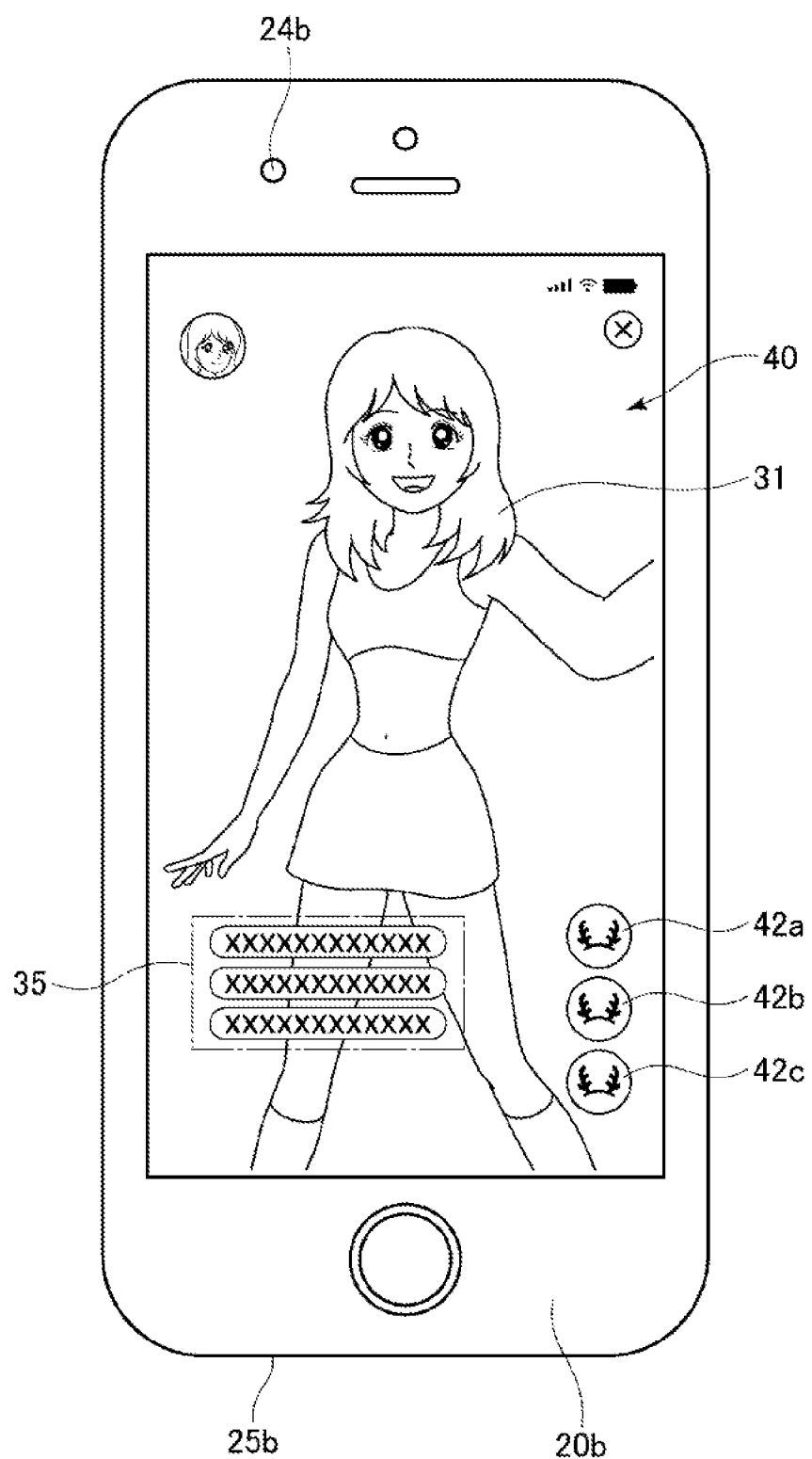
FIG. 4B illustrates an example of a view on a screen of a distributor user device 20b in one embodiment.

Examples of a view of a video distributed by the video distribution unit 61*c* are shown in FIGS. 3 and 4A to 4B. In these illustrated examples, it is assumed that the distributor user Ub distributes a video that includes its own character object by using the distributor user device 20*b*, and the video is played on the viewer user device 10 and the distributor user devices 20*a* and 20*b*. In FIG. 4A, it is assumed that the distributor user Ua does not distribute a video and is viewing the video distributed by the distributor user Ub, which is a different user from the distributor user Ua. Similar assumptions are made for FIGS. 6, 7A, and 7B, which will be described later. Accordingly, in the description of FIGS. 3, 4A to 4B, 6, and 7A to 7B, the distributor user Ua may also be referred to as a viewer user. FIG. 3 shows an example of a view of a video played on the viewer user device 10, FIG. 4A shows an example of a view of a video played on the distributor user device 20*a*, and FIG. 4B shows an example of a view of a video played on the distributor user device 20*b*.

As shown in FIG. 3A, a view 30 of a video distributed from the server device 60 is displayed on the display of the viewer user device 10. The view 30 on the screen of the viewer user device 10 includes a character object 31 corresponding to the distributor user Ub generated by the animation generation unit 61*a*, a gift button 32, an evaluation button 33, a comment button 34, and a comment display area 35.

As shown in FIG. 4A, a view 130 of a video distributed from the server device 60 is displayed on the display of the distributor user device 60. Similarly to the view 30, the view 130 on the screen of the viewer user device 10 includes the character object 31 corresponding to the distributor user Ub, a gift button 32, an evaluation button 33, a comment button 34, and a comment display area 35. In addition, the view 130 includes a co-performing request button 36 for requesting for co-performance with the distributor user Ub in the video being distributed by the distributor user Ub. The distributor user device 20*a* is able to display the view 130 of the distributed video by executing an application software including the viewing program, for example.

As shown in FIG. 3, in one embodiment, the view 30 on the viewer user device 10 does not include the co-performing request button 36. For example, when an application software including the distribution program is not downloaded or installed in the viewer user device 10, or when the application software including the distribution program is not activated in the viewer user device 10, the view 30 on the screen of the viewer user device 10 is generated such that the co-performing request button 36 is not included in the view. In other embodiment, the co-performing request button 36 may also be displayed in the view 30 on the screen of the viewer user device 10. For example, when the application software including the distribution program is downloaded or installed in the viewer user device 10, or when the application software including the distribution program has been activated in the viewer user device 10, the view 30 on the screen of the viewer user device 10 is generated such that the co-performing request button 36 is included in the view.

Since the character object 31 is generated by applying the face motion data of the distributor user Ub to the model data included in the model data 63*a* as described above, the character object 31 changes its facial expression in synchronization with the change in the facial expression of the distributor user Ub. When the body motion data is provided from the distributor user device 20, the character object 31 may be controlled such that its body parts other than the face also move in synchronization with the body movement of the distributor user Ub.

The gift button 32 is displayed on the view 30 such that it is selectable by an operation on the viewer user device 10. The gift button 32 may be selected, for example, by tapping a region of a touch-screen panel of the viewer user device 10 where the gift button 32 is displayed. In one embodiment, when the gift button 32 is selected, a window for gifting appears in the view 30 and the viewer user is able to select a gift to be gifted to the distributor user of the video which the viewer user is watching. The viewer user is able to purchase a gift to be gifted to the distributor user from among the gifts displayed in the window. In another embodiment, in response to selection of the gift button 32, the view 30 displays a window including a list of purchased gifts. In this case, the viewer user is able to select a gift to be gifted to the distributor user from among the listed gifts displayed in the window. Giftable or purchasable gifts may include effect gifts, regular gifts, wear gifts, and any other gifts.

The evaluation button 33 is displayed on the view 30 such that it is selectable by a viewer user using the viewer user device 10. The evaluation button 33 may be selected, for example, by tapping a region of the touch-screen panel of the viewer user device 10 where the evaluation button 33 is displayed. When the evaluation button 33 is selected by a viewer user who is watching the video, evaluation information indicating that a positive evaluation has been made on the video may be transmitted to the server device 60. The server device 60 may tally evaluation information from the viewer user device 10 and other viewer user devices. Once the evaluation button 33 is selected, evaluation information indicating that a negative evaluation has been made on the video may be transmitted to the server device 60. Evaluation information indicating that a positive evaluation has been made on a video may be referred to as positive evaluation information, and evaluation information indicating that a negative evaluation has been made on the video may be referred to as negative evaluation information.

The comment button 34 is displayed in the view 30 such that it is selectable by a user. When the comment button 34 is selected by, for example, tapping, a comment input window for writing a comment is displayed on the view 30. The viewer user is able to write a comment via an input mechanism of the viewer user device 10 or the distributor user device 20a. The inputted comment is transmitted to the server device 60 from the viewer user device 10 and the distributor user device 20a. The server device 60 receives comments from the viewer user device 10, the distributor user device 20a, and any other user devices, and displays the comments in the comment display area 35 in the view 30. In the comment display area 35, comments posted from users are displayed, for example, in a timeline manner. The comment display area 35 occupies a part of the view 30. The number of comments that can be displayed in the comment display area 35 is limited. In the illustrated example, up to three comments can be displayed in the comment display area 35. When the number of comments exceeding the upper limit are posted in the comment display area 35, comments are deleted from the comment display area 35 in order from the oldest one. Therefore, the higher the frequency of comments received is, the shorter the display time of each comment in the comment display area 35 becomes.

As shown in FIG. 4B, a view 40 of the video distributed from the server device 60 is displayed on the display of the distributor user device 20b. The view 40 on the screen of the distributor user device 20b includes the character object 31 corresponding to the distributor user Ub, display instruction buttons 42a to 42c for displaying wear gifts for which viewer users made display requests, and the comment display area 35. The view 40 on the screen of the distributor user device 20b includes the same background image, character object image, and comment(s) as the view 30 and the view 130. The view 40 is different from the views 30 and 130 in that the view 40 does not include the gift button 32, the evaluation button 33, the comment button 36, and the co-performing request button but includes the display instruction buttons 42a to 42c. In one embodiment, the view 130 on the screen of the distributor user device 20a may include a game start button (not shown) for starting the game. When the game start button is selected on the distributor user device 20b, the game corresponding to the game start button is started on the distributor user device 20b. When the game is started on the distributor user device 20b, an image of the game may be displayed on the distributor user device 20b and may be distributed from the server device 60 to the viewer user device 10. The game image may include a character object corresponding to the distributor user Ub. Rendering for generating the game image may be performed by the server device 60 or the viewer user device 10.

The display instruction buttons 42a to 42c appear on the view 40 in response to reception of a display request to display a wear gift from a viewer user. In the illustrated embodiment, the three display instruction buttons 42a to 42c are displayed in the display image 40. Each of the display instruction buttons 42a to 42c is displayed on the view 40 such that they are selectable by the distributor user. When one of the display instruction buttons 42a to 42c is selected by, for example, tapping thereon, processing for displaying a wear gift corresponding to the selected display instruction button is performed. As described above, the display instruction buttons 42a to 42c are display instruction objects for instructing to display a corresponding wear gift in the video being live-distributed. Therefore, in this specification, the display instruction buttons 42a to 42c may be also referred to as display instruction objects 42a to 42c. In the case where it is not necessary to distinguish the display instruction objects 42a to 42c from one another, they may be collectively referred to as the display instruction object 42. A specific example of displaying the wear gift will be described later. The view 40 may be displayed on the above-mentioned supporter computer. The display instruction objects 42a to 42c may be selected according to operation of the supporter computer by a supporter.

Each time a display request requesting display of a wear gift is accepted, the display instruction object 42 corresponding to the display request is added to the view 40. The number of the display instruction objects 42 that can be displayed on the view 40 is limited. In the illustrated embodiment, the maximum number of the display instruction objects 42 that are allowed to be displayed on the view 40 is three. In this case, the view 40 has a display area in which up to three display instruction objects can be displayed. When four or more display requests to display the wear gift are received, the display instruction object 42 corresponding to the fourth and subsequent display requests are not displayed on the view 40. The display instruction object 42 corresponding to the fourth display request of the wear gift is displayed in the view 40 when any of the previous three display instruction objects 42 that have been already displayed is selected and thereby a space for displaying the object corresponding to the fourth display request is created.

The gift request processing unit 21f receives a display request to display a gift object from a viewer user, and performs processing to display the gift for which the display request is made. Each viewer user is able to transmit a display request to display a gift to the server device 60 by operating his/her viewer user device. The display request to display a gift may include a user ID of a viewer user and gift identification information (gift ID) that identifies the gift for which the display request is made, and/or, gift object identification information (gift object ID) that identifies the gift object for which the display request is made.

As described above, the gift object may include the effect object corresponding to the effect gift, the normal object corresponding to the normal gift, and the wear object corresponding to the wear gift. The wear gift is an example of a first gift. The wear object may be also referred to as a first gift object. The display request for requesting the display of the attached gift (or attached object) is an example of the first display request. The effect object and the normal object are examples of a second object. The effect object and normal object may be also collectively referred to as a second gift object. A display request to request the effect gift (or effect object) or the normal gift (normal object) is an example of a second display request.

Figure 5:
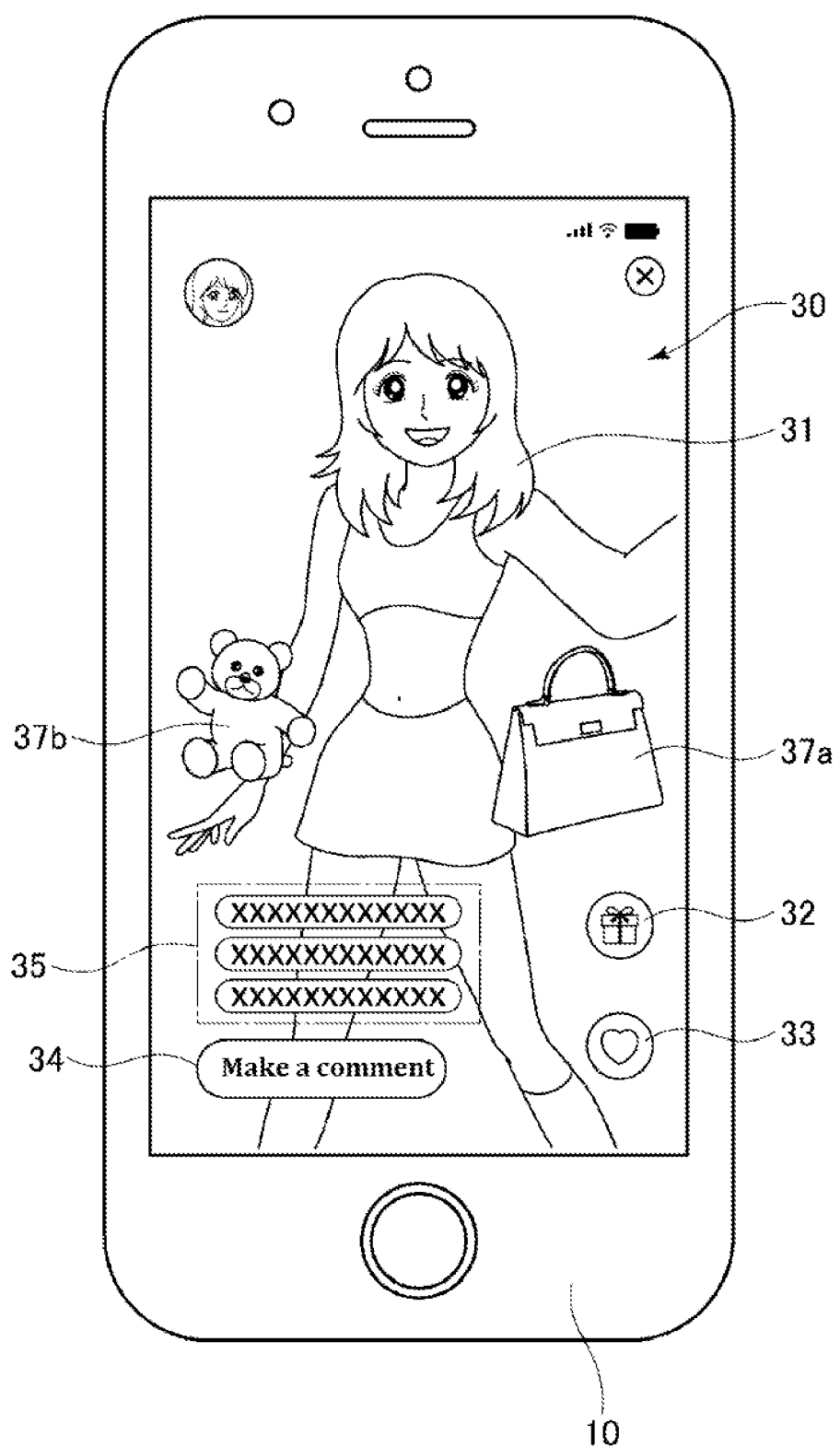
FIG. 5 illustrates an example of a view on the screen of the viewer user device 10 in one embodiment. In the view of FIG. 5, an example of a normal object is shown.

In one embodiment, when the gift request processing unit 61d received a display request to display a specific normal gift from a viewer user, the gift request processing unit 61d performs a process, in response to the display request, to display, in the video, a normal object representing the normal gift for which the display request is made. For example, when a display request to display a normal object representing a bag is made, the gift request processing unit 61d displays a normal object 37a that represents the bag in the view 30 based on the display request as shown in FIG. 5. Similarly, when a display request to display a normal object representing a stuffed bear is made, the gift request processing unit 61d displays a normal object 37b representing a stuffed bear in the view 30 based on the display request as shown in FIG. 5. Although not shown, the normal objects 37a and 37b are shown in the view 130 on the screen of the distributor user device 20a and the view 40 on the screen of the distributor user device 20b in the same manner as the view 30.

In one embodiment, when the gift request processing unit 61d received a display request to display a specific effect gift from a viewer user, the gift request processing unit 61d performs a process, in response to the display request, to display, in the display image of the video, an effect object corresponding to the effect gift for which the display request is made. For example, when a display request to display an effect gift simulating confetti, fireworks or the like is made, the gift request processing unit 61d displays, in the views 30, 130 and 140, an effect object (not shown) representing the confetti, fireworks or the like based on the display request.

A display request for a normal gift may include a display position specifying parameter for specifying the display position of a normal object simulating the normal gift. In this case, the gift request processing unit 61d may display the normal object at the position specified by the display position specifying parameter. When a display position and a display range of the character object 31 are defined, the display position designation parameter may designate a position relative to the character object 31 as the display position of the normal object.

In one embodiment, the normal object may be displayed such that it moves within the view 30 of the video. For example, the normal objects 37a and 37b may be displayed such that they fall from the top to the bottom of the screen. In this case, the normal objects 37a and 37b may be displayed in the view 30 during the fall, which is from when the object starts to fall and to when the object has fallen to the bottom of the view 30, and may disappear from the view 30 after it has fallen to the bottom of the view 30. The moving directions of the normal objects 37a and 37b in the screen can be specified as desired. For example, the normal objects 37a and 37b may be displayed in the view 30 such that they move from the left to the right, the right to the left, the upper left to the lower left, or any other direction in the view 30 The normal objects 37a and 37b may move on various paths. For example, the normal objects 37a and 37b may move on a linear path, a circular path, an elliptical path, a spiral path, or any other paths. The viewer user may include, in the display request to display the normal object, a moving direction parameter that specifies the moving directions of the normal objects 37a and 37b and/or a path parameter that specifies the path on which the normal objects 37a and 37b move, in addition to or in place of the display position specifying parameter. In one embodiment, among the effect objects and the normal objects, those whose size in the virtual space is smaller than a reference size may be displayed such that a part or all of the object(s) is overlapped with the character object 31. In one embodiment, among the effect objects and the normal objects, those whose size in the view 30 is larger than the reference size may be displayed at a position where the object is not overlapped with the character object 31. In one embodiment, among the effect objects and the normal objects, those whose size in the virtual space is larger than the reference size may be displayed behind the character object 31. The normal objects 37a and 37b may be displayed such that they move as described above in the view 130 and the view 40.

Figure 6:
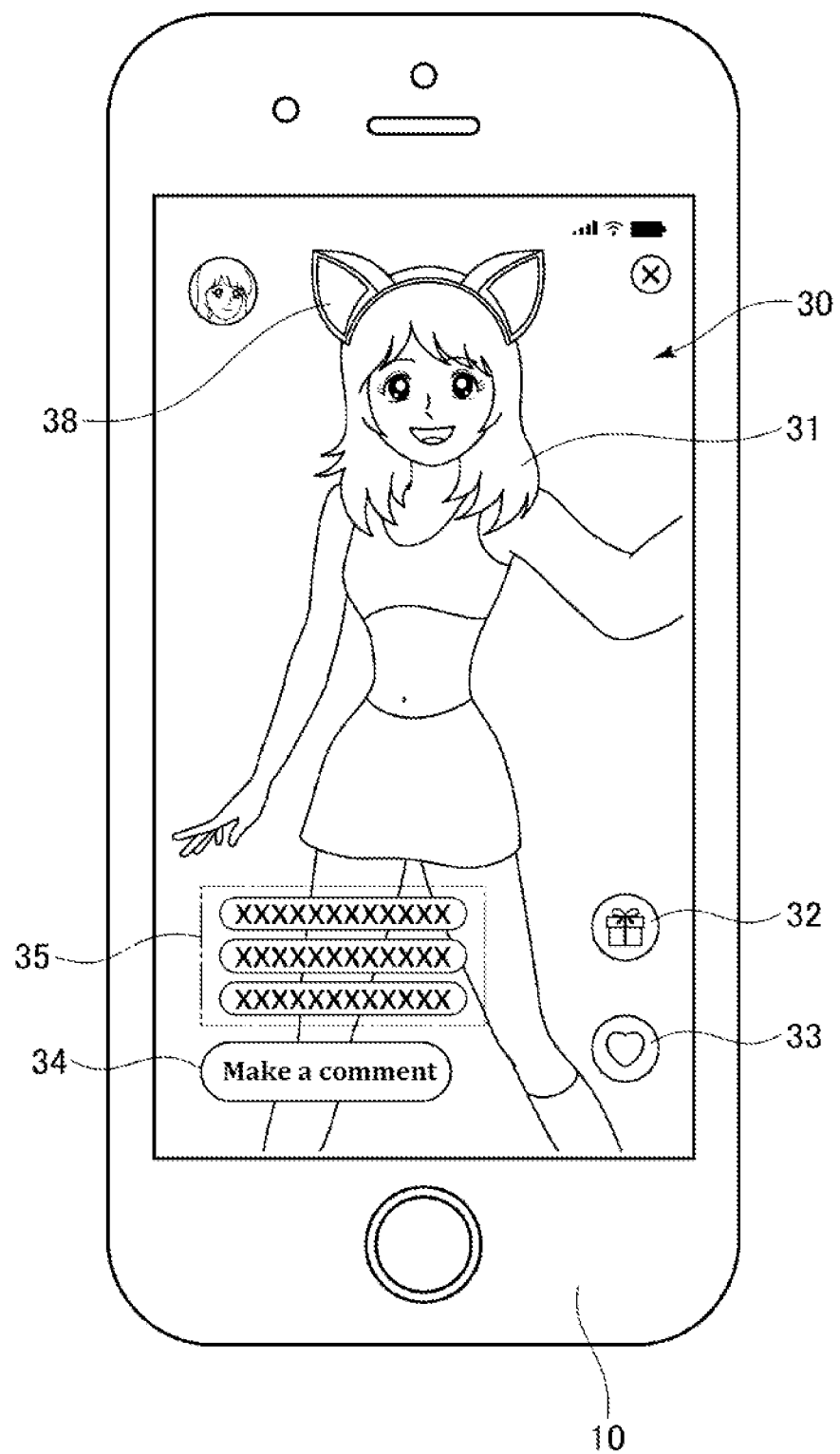
FIG. 6 illustrates an example of a view on the screen of the viewer user device 10 in one embodiment. In the view of FIG. 6, an example of a wear object is shown.
Figure 7A:
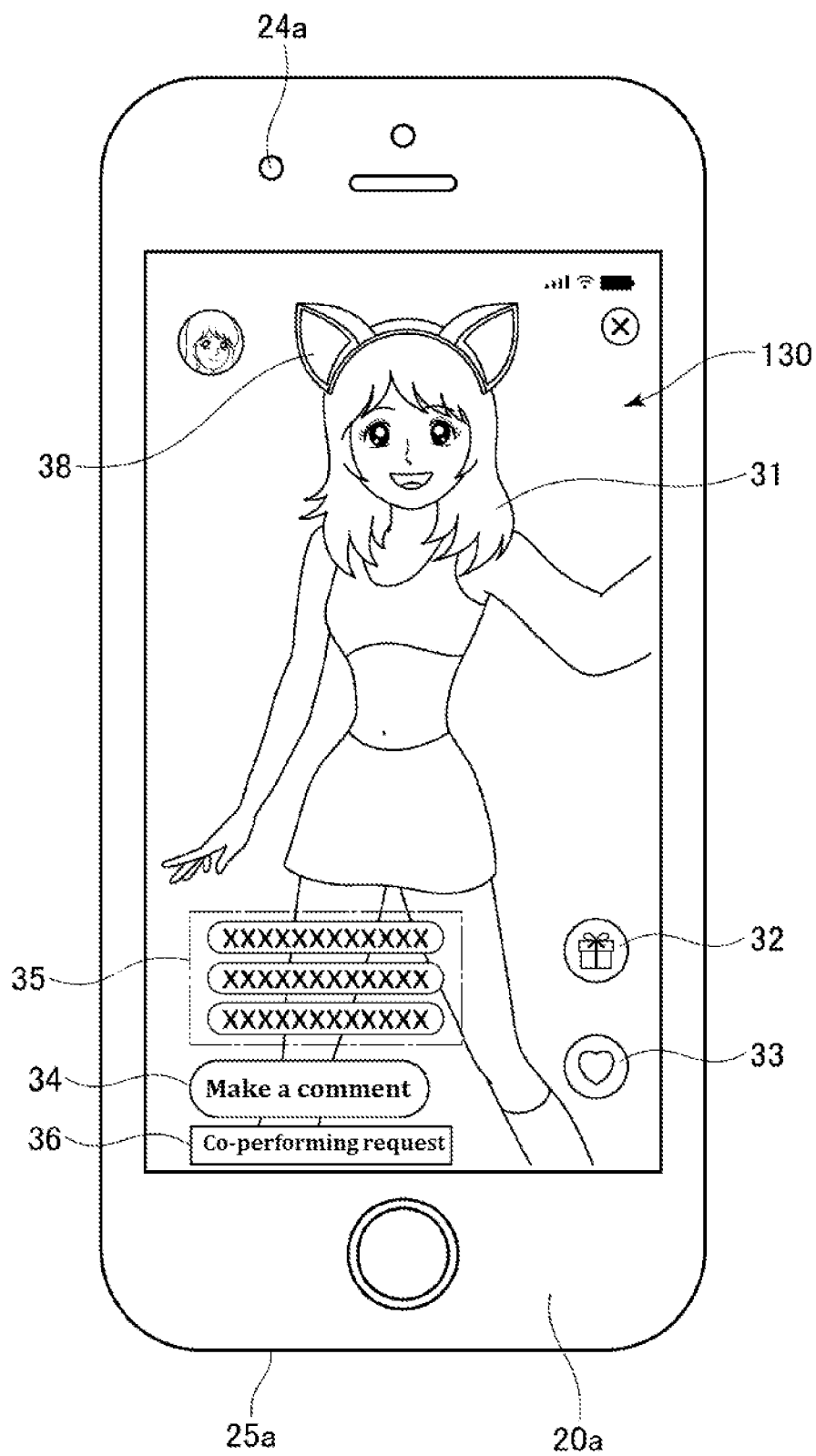
FIG. 7A illustrates an example of a view on the screen of the distributor user device 20a in one embodiment. In the view of FIG. 7A, an example of the wear object is shown.
Figure 7B:
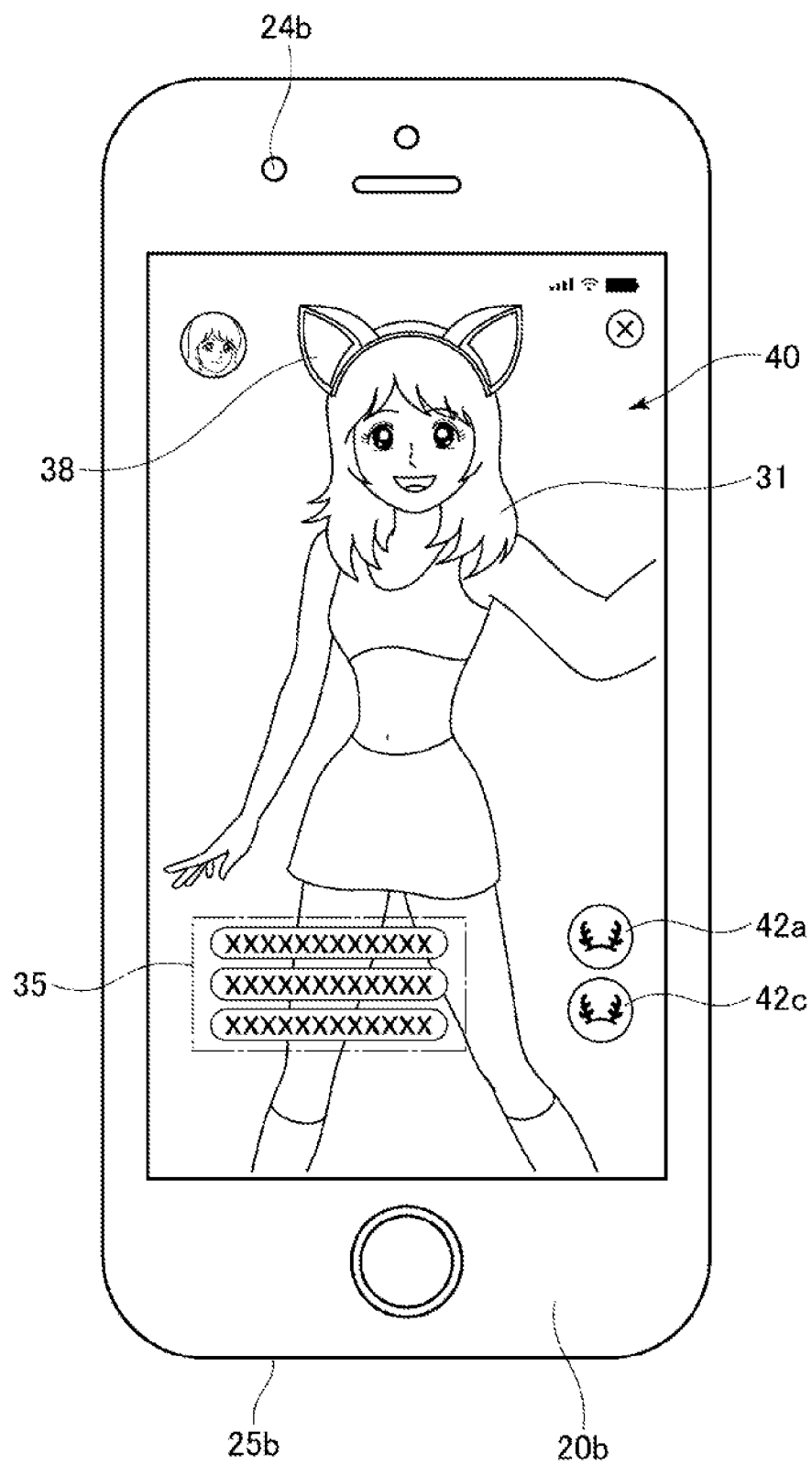
FIG. 7B illustrates an example of a view on the screen of the distributor user device 20b in one embodiment. In the view of FIG. 7B, an example of the wear object is shown.

In one embodiment, when the gift request processing unit 61d received a display request to display a specific wear object from a viewer user, the gift request processing unit 61d displays the display instruction objects 42a to 42c on the view 40 of the distributor user device 20 as shown in FIG. 4B. Each of the display instruction objects 42a to 42c corresponds to the wear gift for which the display request has been made. When one of the display instruction objects 42a to 42c is selected, the wear gift associated with the selected display instruction object is displayed in the video that is being live distributed. For example, when the display instruction object 42b is associated with a headband simulating cat's ears and the display instruction object 42b is selected, the gift request processing unit 61d displays, in the video being live distributed, the wear object 38 representing the headband and corresponding to the selected display instruction object 42b. Examples of a view of a video including the wear object 38 representing the headband are shown in FIGS. 6 and 7A to 7B. Also, as shown in FIG. 7B, the selected display instruction object 42b is removed from the view 40. In one embodiment, a wear object for which a display request has been made may be automatically displayed in the video being distributed in response to the reception of the display request for the wear object. When the wear object is automatically displayed in the video in response to the display request for the wear object, the display instruction objects 42a to 42c are not necessarily displayed on the screen. In one embodiment, the server device 60 may have an "automatic wear mode" and a "manual wear mode" as display modes of the wear objects in a video. In the automatic wear mode, a wear object is automatically displayed in the video being distributed in response to a display request for the wear object (that is, even if there is no selection operation by a distributor user). In the manual wear mode, a wear object is displayed in the video in response to the distributor user's selection of the wear object for which the display request has been made. The wear object may be selected by operating the display instruction objects 42a to 42c as described above. These modes may be switchable between them. In one embodiment, the display mode of the wear object may be set to the manual wear mode in a co-performing video and to the automatic wear mode in a non-co-performing video which is not the co-performing video. A video that includes a character object corresponding to a host user but in which other user(s) does not appear is herein referred to as the non-co-performing video.

The wear object is displayed in the video in association with a specific body part (worn-on portion) of a character object. For example, the wear object may be displayed such that it contacts with the worn-on body portion of the character object. The wear object 38 may be displayed in the video such that it is worn by the character object at the worn-on body portion. In one embodiment, the wear object 38 representing the headband is association with the head of the character object. Thus, in the view examples of FIGS. 6 and 7A to 7B, the wear object 38 is worn on the head of the character object 31. The wear object may be displayed on the video screen such that it moves along with the motion of the body part of the character object where the object is worn. For example, when the head of the character object 31 with the wear object 38 representing the headband moves, the wear object 38 representing the headband also moves in accordance with the motion of the head of the character object 31 as if the headband is attached to the head of the character object 31.

As described above, the object data 63*b* may include worn-on portion information indicating which portion of the character object the wear object is associated with. In one embodiment, when the wear object is worn by the character object, the gift request processing unit 61*d* prevent any other wear object(s) that is worn on the same or overlapping body part as the body part designated by the worn-on portion information of the wear object from being displayed until a display time of the wear object elapses. For example, in a case of a headband associated with "the rear left side of the head" and "the rear right side of the head" and a hair accessory associated with "the rear left side of the head," display of the hair accessory whose worn-on portion information indicates "the rear left side of the head" is prevented while the headband is displayed since their worn-on portions overlap in the "the rear left side of the head." On the other hand, in a case of the headband associated with "the rear left side of the head" and "the rear right side of the head" and an earring associated with "the left ear (of the head)" and "the right ear (of the head)," they can be worn at the same time since their worn-on portions of the character object do not overlap with each other.

In one embodiment, in order to prevent two or more wear objects having the same or overlapping worn-on portion from being displayed, the display instruction object 42 for displaying the wear object whose display is to be prevented may be deactivated. In the embodiment shown in FIG. 4B, it is assumed that the display instruction object 42*a* is an object (button) for instructing display of a hair accessory whose worn-on portion information designates the "the rear left side of the head." In this case, since the character object 31 wears the wear object 38 representing the headband, the wear object representing the hair accessory is prohibited from being displayed in the video while the wear object 38 is worn by the character object 31. In one embodiment, in order to prevent the wear object representing the hair accessory from being displayed, the display instruction object 42*a* associated with the wear object representing the hair accessory may be deactivated. For example, the display instruction object 42*a* is made unselected even if a user tries to operate it while the wear object 38 is worn by the character object 31. In another embodiment, the display instruction object 42*a* is removed from the view 40 while the wear object 38 is worn by the character object 31. The deactivated display instruction object 42*a* is reactivated when the display time of the headband has elapsed. In order to reactivate the display instruction object 42*a*, for example, the display instruction object 42*a* that has been disabled may be made selectable again, or the display instruction object 42*a* that has been hidden may be displayed again on the view 40.

In one embodiment, in response to a request from a viewer user of the video, the gift purchase processing unit 61*e* transmits, to the viewer user device of the viewer user (for example, the viewer user device 10 and the distributor user device 20*a*), purchase information on a plurality of gift objects that can be purchased in relation to the video. The purchase information of each gift object may include the type of the gift object (the effect object, the normal object, or the wear object), the image of the gift object, the price of the gift object, and any other information necessary to purchase the gift object. The viewer user is able to select a gift object to purchase considering the purchase information of the gift object displayed on the viewer user device 10 or the distributor user device 20*a*. The selection of the gift object to purchase may be performed by operating the viewer user device 10 or the distributor user device 20*a*. When a gift object to be purchased is selected by the viewer user, a purchase request for the gift object is transmitted to the server device 60. The gift purchase processing unit 61*e* performs a payment process based on the purchase request. When the payment process is completed, the purchased gift object is held by the viewer user. The storage 23 may store a gift ID of the purchased gift (or a gift object ID of the gift object representing the gift) in association with the user ID of the viewer user who has purchased the gift.

Gift objects that can be purchased may be different for each video. The gift objects may be made purchasable in two or more different videos. That is, the purchasable gift objects may include a gift object unique to each video and a common gift object that can be purchased in multiple videos. For example, the effect object that simulates confetti may be the common gift object that can be purchased in the two or more different videos.

In one embodiment, when a user purchases an effect object while viewing a video, the purchased effect object may be displayed automatically in the video that the user is viewing in response to completion of the payment process to purchase the effect object. In the same manner, when a user purchases a normal object while viewing a video, the purchased normal object may be automatically displayed in the video that the user is viewing in response to completion of the payment process to purchase the normal object.

In another embodiment, in response to completion of the payment process performed by the gift purchase processing unit 61*e* for the effect object to be purchased, a notification of the completion of the payment process may be sent to the viewer user device 10, and a confirmation screen may be displayed to allow the viewer user to confirm whether he/she wants to make a display request to display the purchased effect object on the viewer user device 10. When the viewer user selects to make the display request for the purchased effect object, the display request to display the purchased effect object may be sent from the client device of the viewer user to the gift request processing unit 61*d*, and the gift request processing unit 61*d* may perform the process to display the purchased effect object in the video 70. Even when the normal object is to be purchased, a confirmation screen may be displayed on the viewer user device 10 to confirm whether the viewer user wants to make a display request to display the purchased normal object, in the same manner as above.

When one distributor user made a co-performing request to another distributor user, the co-performing request processing unit 61*f* generates, based on the co-performing request, a co-performing video in which the one distributor user and the other distributor user virtually appear together. In the following description, it is assumed that the distributor user Ua who is viewing the video including the character object 31 of the distributor user Ub makes the co-performing request to the distributor user Ub. The co-performing request processing unit 61*f* may generate the co-performing video based on not only the co-performing request from the distributor user Ua but also the co-performing requests from various distributor users.

In one embodiment, the co-performing request processing unit 61*f* receives the co-performing request from the distributor user Ua and generates the co-performing video in response to the co-performing request. The distributor user Ua is able to send the co-performing request to the server device 60 by operating the distributor user device 20*a*. Specifically, when the co-performing request button 36 displayed on the distributor user device 20*a* is selected, the co-performing request is transmitted from the distributor user device 20*a* to the server device 60. The co-performing request button 36 may be selected, for example, by tapping a region of the touch-screen panel of the viewer user device 20*a* where the co-performing request button 36 is shown. In response to the selection of the co-performing request button 36, the application software including the distribution program may be activated in the distributor user device 20*a*. The co-performing request transmitted from the distributor user device 20*a* may include the user ID that identifies the distributor user Ua.

Upon receiving the co-performing request from the distributor user device 20*a*, the co-performing request processing unit 61*f* determines whether to approve the co-performing request. The co-performing request processing unit 61*f* is capable of determining whether to approve the co-performing request based on various information about the distributor user Ua who made the co-performing request. For example, when evaluations for the distributor user Ua made by other users is higher than a predetermined standard, the co-performing request from the distributor user Ua may be approved, and whereas the evaluations for the distributor user Ua made by other users is lower than the standard, the co-performing request from the distributor user Ua may be rejected. Additionally or alternatively, the distributor user Ub may be inquired as to whether to approve the co-performing request from the distributor user Ua, and the processing unit may determine whether to approve or reject the co-performing request according to the answer.

In one embodiment, when the co-performing request from the distributor user Ua is approved, the co-performing request processing unit 61*f* generates a co-performing video in which the distributor user Ua and the distributor user Ub appear together. In order to generate the co-performing video, the co-performing request processing unit 61*f* obtains the face motion data and the voice data of the distributor user Ua from the distributor user Ua. The face motion data of the distributor user Ua may be transmitted from the distributor user device 20*a* to the server device 60 together with the co-performing request, or it may be transmitted to the server device 60 from the distributor user device 20*a* in response to a request from the server device 60 after the co-performing request is approved. When body movements of the distributor user Ua are also expressed as an animation, the body motion data of the distributor user Ua may be provided to the server device 60 together with the face motion data. When the face motion data cannot be obtained from the distributor user Ua, the co-performing request processing unit 61*f* may obtain only the voice data from the distributor user Ua. For example, when the distributor user device 20*a* used by the distributor user Ua does not have the function of the face motion data generation unit 211*a* or other functions for video distribution or when the functions are disabled or in any other cases where the face motion data cannot be obtained, the co-performing request processing unit 61*f* may obtain the voice data without obtaining the face motion data (and the body motion data) from the distributor user Ua.

In one embodiment, the co-performing request processing unit 61*f* adds an animation of the character object of the distributor user Ua to the video including the character object 31 of the distributor user Ub based on the face motion data of the distributor user Ua to generate co-performing images. The animation of the character object of the distributor user Ua may be generated in the animation generation unit 61*a* based on the face motion data of the distributor user Ua. The animation of the character object of the distributor user Ua may be generated by applying the face motion data of the distributor user Ua to a model data for the distributor user Ua included in the model data 63*a*. For example, the co-performing request processing unit 61*f* generates a layer including the animation of the character object of the distributor user Ua, and superimposes this layer on the video that includes the character object 31 of the distributor user Ub to generate a co-performing video that includes the character object of the distributor user Ua and the character object 31 of the distributor user Ub. When the co-performing request processing unit 61*f* obtains the voice data without obtaining the face motion data (and body motion data) from the distributor user Ua, it is possible to generate a co-performing video that includes the character object 31 of the distributor user Ub and the voice of the distributor user Ua by superimposing a voice generated based on the voice data obtained from the distributor user Ua on the video that includes the the character object 31 of the distributor user Ub. When a model data for the distributor user Ua is not included in the model data 63*a*, it is also possible for the co-performing request processing unit 61*f* to generate the co-performing video that includes the character object 31 of the distributor user Ub and the voice of the distributor user Ua by superimposing the voice generated based on the voice data obtained from the distributor user Ua on the video that includes the the character object 31 of the distributor user Ub. As described above, the distributor user Ua is able to co-perform with the distributor user Ub by his/her own voice.

When the co-performing request processing unit 61*f* is unable to obtain the face motion data from the distributor user Ua, the co-performing request processing unit 61*f* may first distribute the co-performing video including the voice of the distributor user Ua and the character object 31 of the distributor user Ub. The co-performing request processing unit 61*f* may thereafter generate a character object of the distributor user Ua based on face motion data of the distributor user Ua when it obtained the face motion data from the distributor user Ua and generate a co-performing video that includes the character object of the distributor user Ua and the character object 31 of the distributor user Ub. In this way, the co-performing request processing unit 61*f* may switch the co-performing video that includes the voice of the distributor user Ua and the character object 31 of the distributor user Ub to the co-performing video that includes the character object of the distributor user Ua and the character object 31 of the distributor user Ub. On the contrary, the co-performing request processing unit 61*f* may switch the co-performing video that includes the character object of the distributor user Ua and the character object 31 of the distributor user Ub to the co-performing video that includes the voice of the distributor user Ua and the character object 31 of the distributor user Ub. As described above, the co-performing video using voice to co-perform (may be referred to as a "voice co-performing video") and the co-performing video in which character objects are appear together (may be referred to as a "character co-performing video") may be switchable alternately.

The generated co-performing video is distributed by the video distribution unit 61c. The co-performing video may be created by the distributor user device 20a. When the co-performing video is generated by the distributor user device 20a, the co-performing video is transmitted from the distributor user device 20a to the server device 60 and distributed by the video distribution unit 61c of the server device 60. The co-performing request processing unit 61f may set the display mode of the wear object in the co-performing video to the above-mentioned manual wear mode.

Figure 8:
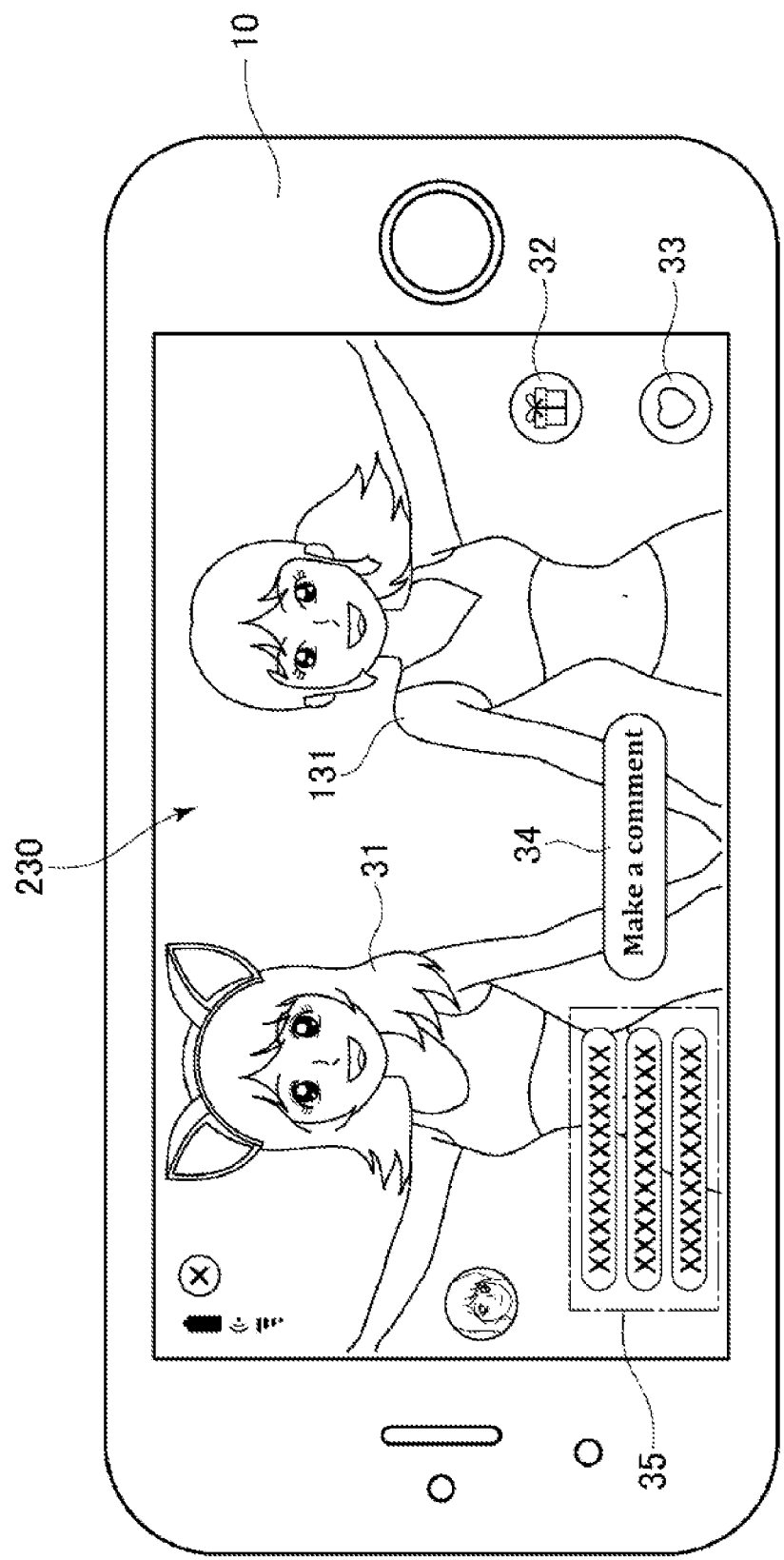
FIG. 8 illustrates an example of a view on the screen of the viewer user device 10 in one embodiment.
Figure 9A:
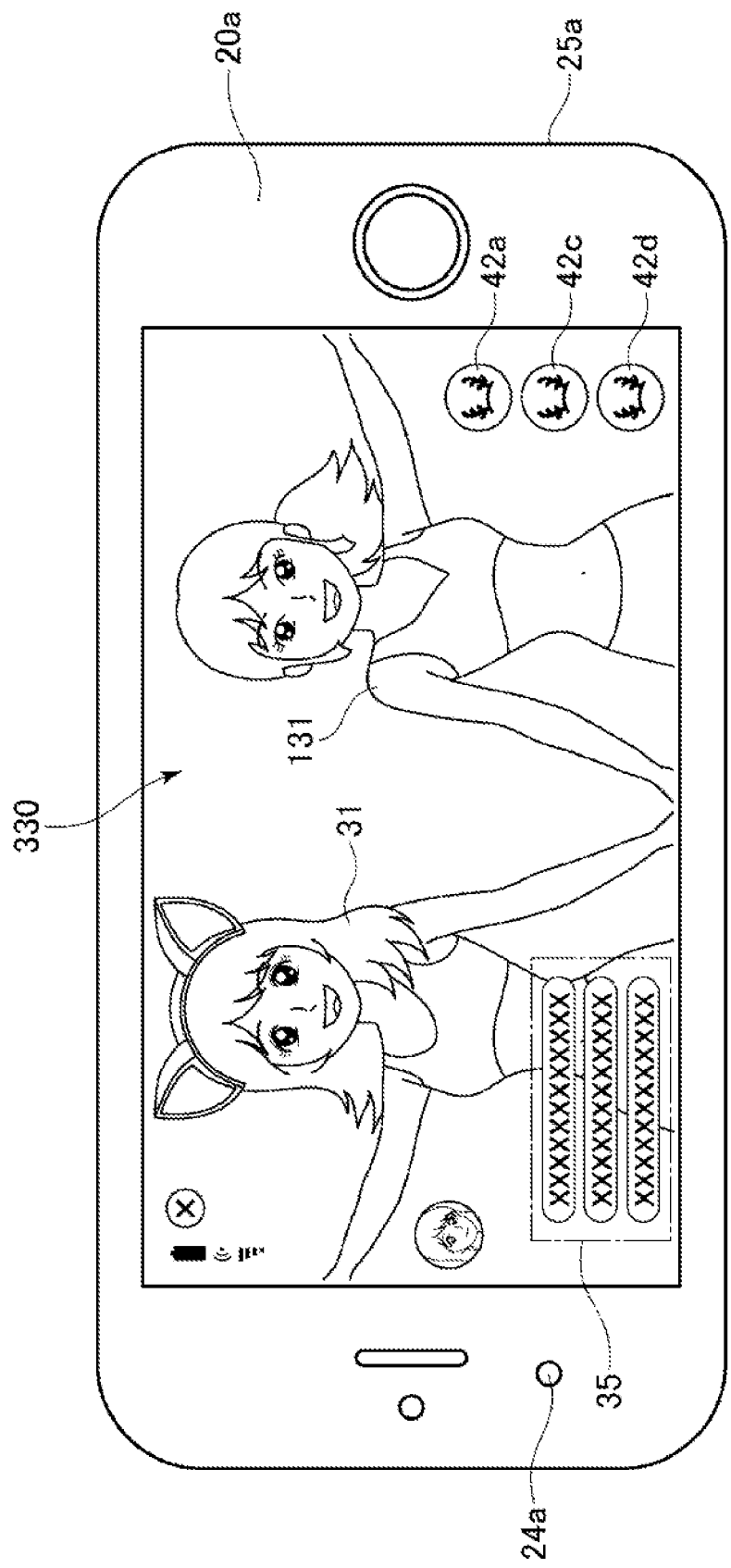
FIG. 9A illustrates an example of a view on the screen of the distributor user device 20a in one embodiment.
Figure 9B:
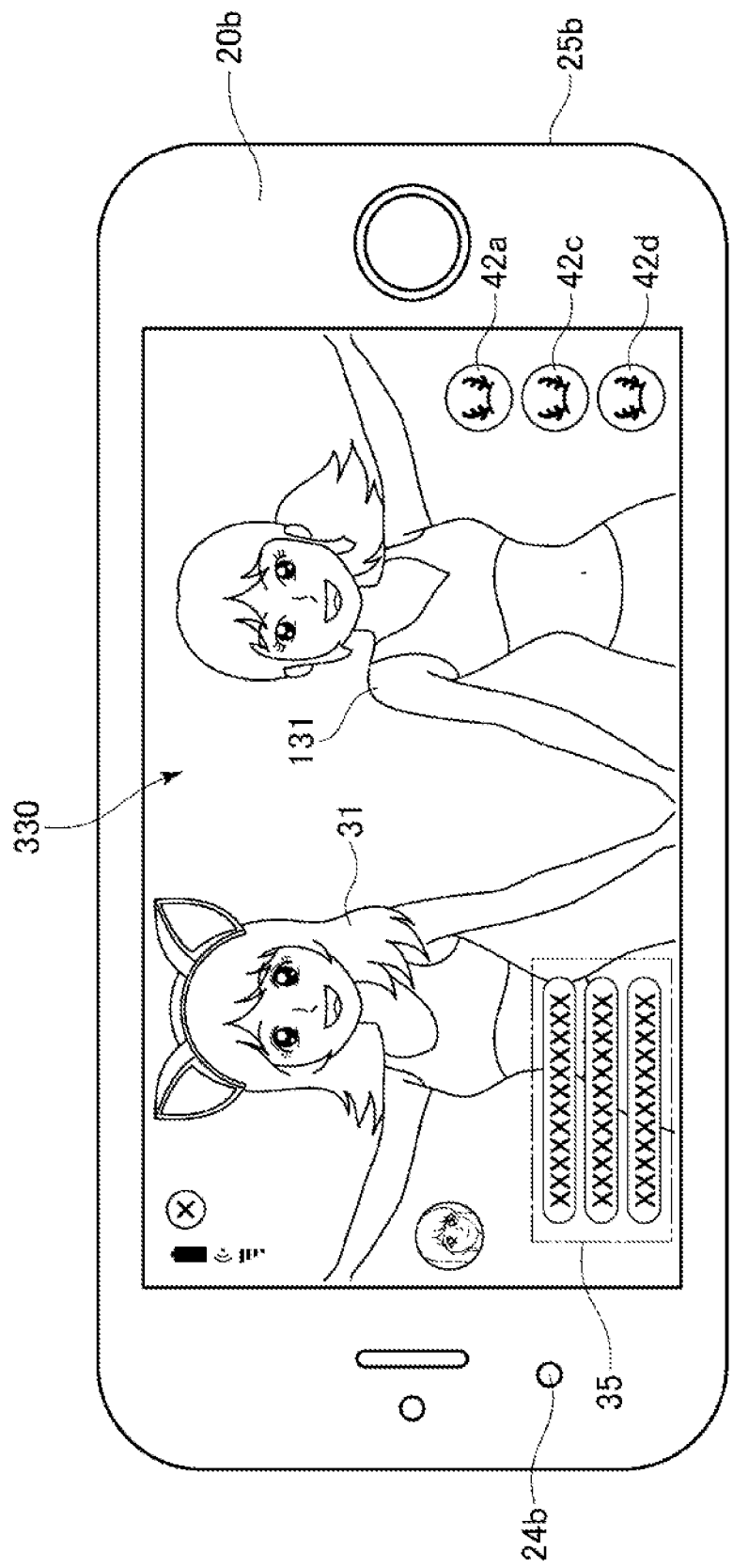
FIG. 9B illustrates an example of a view on the screen of the distributor user device 20b in one embodiment.

Examples of a view of the co-performing video distributed by the video distribution unit 61c are shown in FIGS. 8 and 9A to 9B. In these illustrated examples, it is assumed that the distributor user Ua makes the co-performing request for the video being distributed by the distributor user Ub, and consequently the co-performing video that includes the character object of the distributor user Ua and the character object of the distributor user Ub is distributed. It is also assumed that the distributor user Ua has selected the co-performing request button 36 while viewing the image shown in FIG. 7A.

As shown in FIG. 8, a view 230 of the video distributed from the server device 60 is displayed on the display of the viewer user device 10. The display image 230 of the co-performing video displayed on the viewer user device 10 includes a character object 131 of the distributor user Ua in addition to the character object 31 of the distributor user Ub. The character object 131 of the distributor user Ua is generated by the animation generation unit 61a or the co-performing request processing unit 61f as described above. The view 230 of the co-performing video includes the gift button 32, the evaluation button 33, the comment button 34, and the comment display area 35, similar to the original distribution image shown in FIG. 3.

As shown, a distribution image 230 of the co-performing video is horizontally long. When the co-performing request processing unit 61f or the video distribution unit 61c distributes the co-performing image, it distributes it as a horizontally long image. Thus, the distribution image 230 of the co-performing video is displayed as a horizontally long image on the viewer user device 10. In one embodiment, as shown in FIG. 3, even if the original video (image) is vertically long, the co-performing image is converted to the horizontally long image and distributed. The co-performing image includes the character objects of the two distributor users, therefore it would be easier to display the character objects of the two people without overlapping from each other by making the image horizontally long. For example, in the co-performing image, the left half of the image from the viewpoint of the viewer user may be an area allocated to the character object of the original distributor user and the right half may be an area allocated to the character object of the distributor user who made the co-performing request. An area of the image may be adequately allocated to each distributor user such that their character objects do not overlap with each other.

As shown in FIGS. 9A and 9B, a view 330 of the video distributed from the server device 60 is displayed on the displays of the distributor user devices 20a and 20b. The view 330 includes the same background image, character object image, and comment(s) as the view 230. On the other hand, the view 330 is different from the view 230 in that the view 330 does not include the gift button 32, the evaluation button 33, and the comment button 34, but includes display instruction buttons 42a, 42c, and 42d. Since the distributor user Ua and the distributor user Ub are distributors of the same co-performing image, the same view 330 is displayed on the distributor user device 20a of the distributor user Ua and the distributor user device 20b of the distributor user Ub. Similarly to the view 230, the view 330 is displayed as a horizontally oriented image in order to arrange a plurality of character objects without overlapping from each other. In the examples shown in FIGS. 8 and 9A to 9B, it is assumed that a viewer user who is viewing the co-performing image shown in FIG. 8 requests display of a wear gift representing earrings (a first display request), and in response to the request, the display instruction object 42d is added to the views of the distributor user device 20a and the distributor user device 20b. The display instruction object 42d is an object (button) for instructing display of the earrings whose worn-on portion information designates "ears."

When the distributor user Ua and the distributor user Ub appear together in the co-performing video illustrated in FIGS. 9A and 9B, the distributor user Ua is able to cause his/her character object 131 to wear the wear gift corresponding to the display instruction object 42d by selecting the display instruction object 42d displayed on the distributor user device 20a. Similarly, the distributor user Ub is able to cause his/her character object 31 to wear the wear gift corresponding to the display instruction object 42d by selecting the display instruction object 42d displayed on the distributor user device 20b. The wear gift corresponding to the display instruction object 42d is worn by one or both of the character object 131 of the distributor user Ua and the character object 31 of the distributor user Ub.

Figure 10:
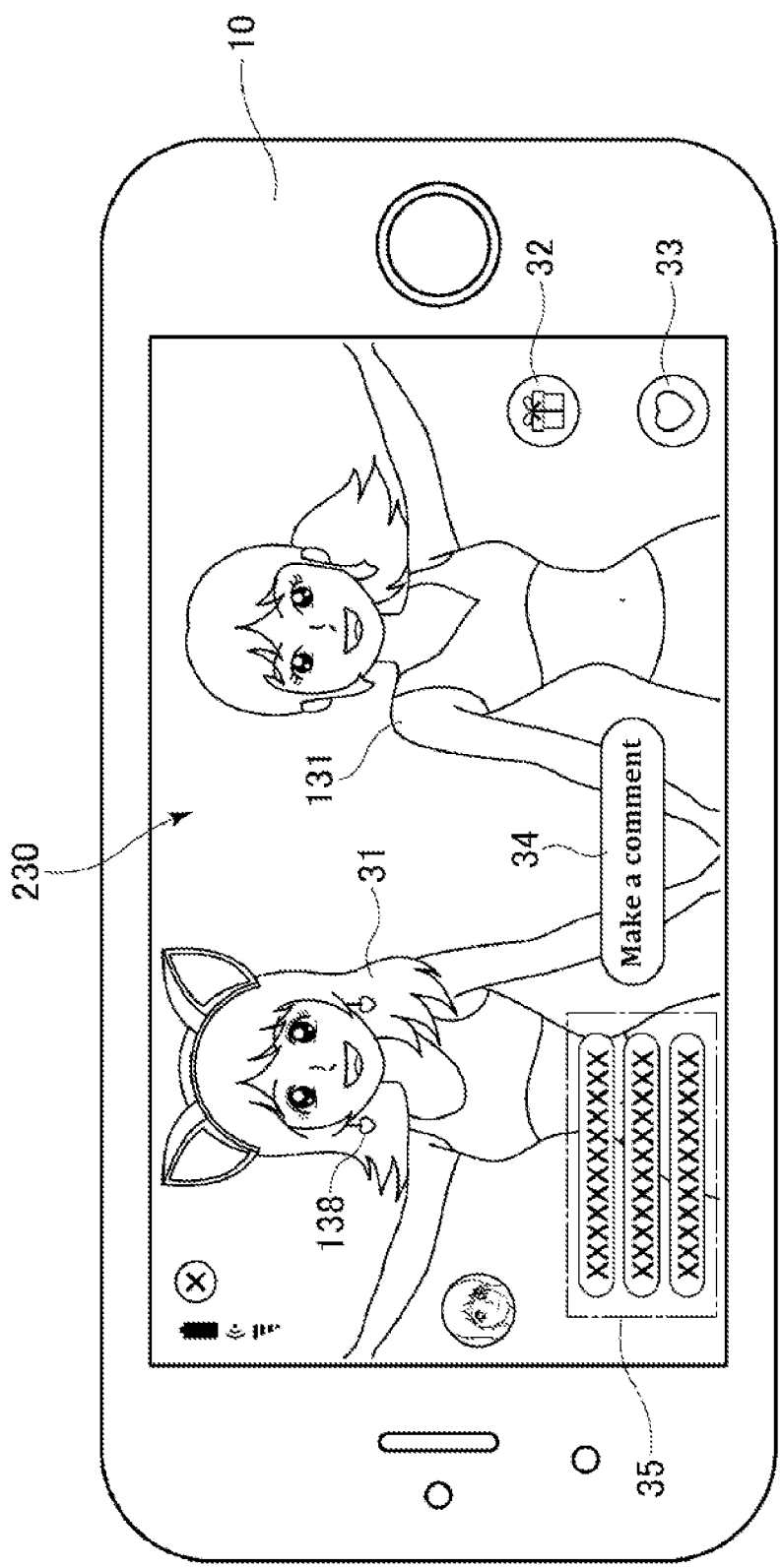
FIG. 10 illustrates an example of a view on the screen of the viewer user device 10 in one embodiment. In the view of FIG. 10, a character object 31 wears a wear object 138.
Figure 11A:
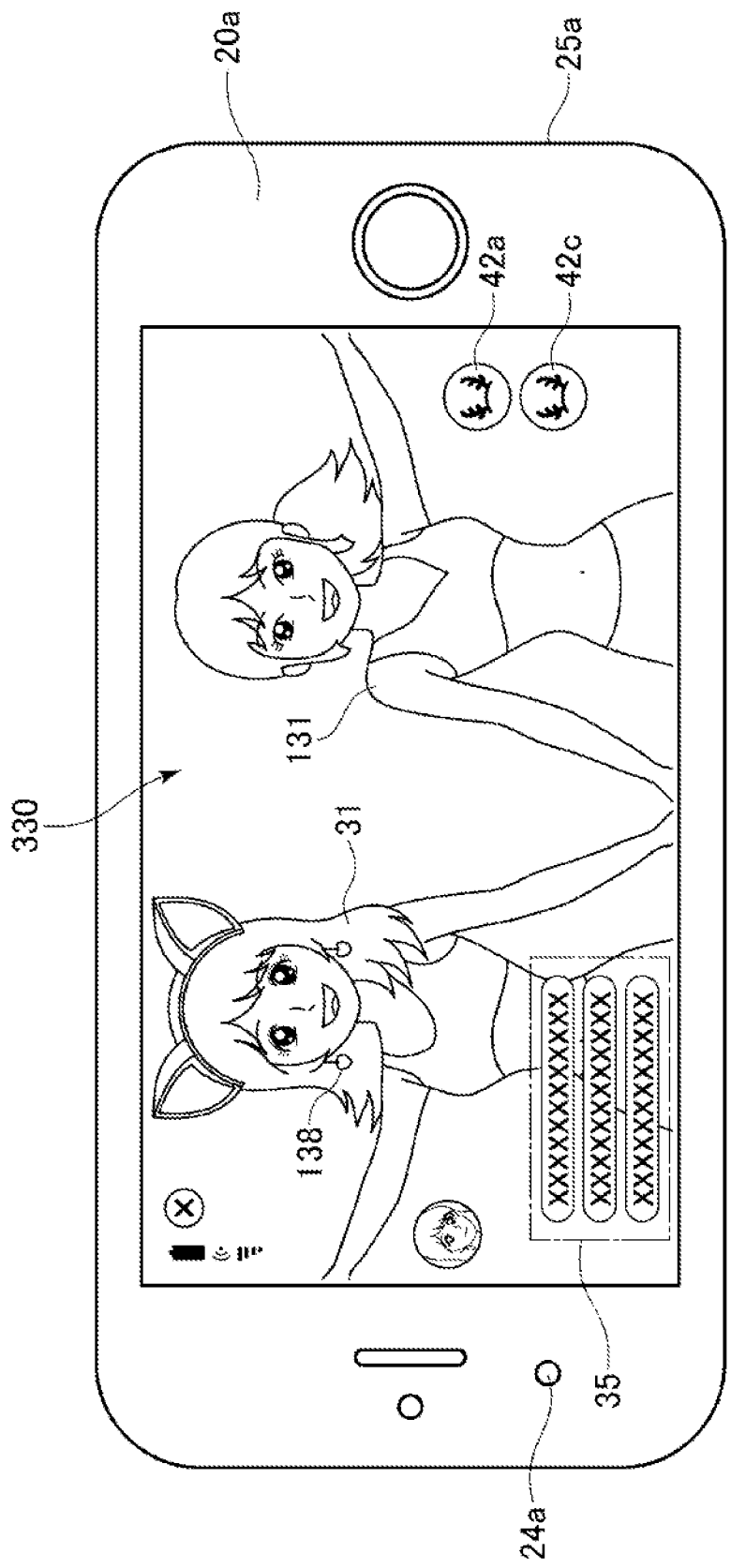
FIG. 11A illustrates an example of a view of a co-performing video displayed on the distributor user device 20a in one embodiment. In the view of FIG. 11A, the character object 31 wears the wear object 138.
Figure 11B:
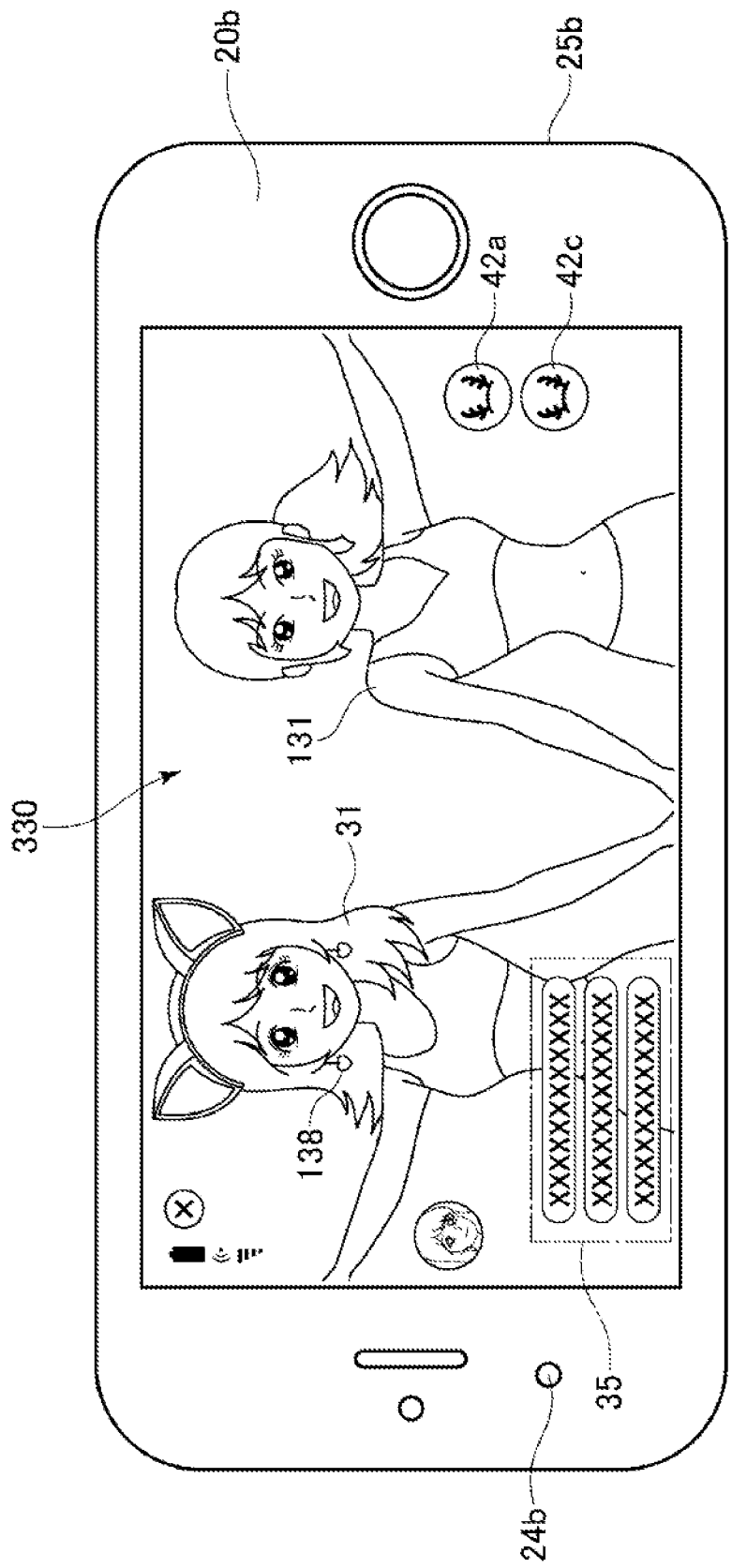
FIG. 11B illustrates an example of a view of the co-performing video displayed on the distributor user device 20b in one embodiment. In the view of FIG. 11B, the character object 31 wears the wear object 138.

When the display instruction object 42d is selected by the distributor user Ub, the distributor user device 20b transmits, to the server device 60, a selection notification indicating that the display instruction object 42d has been selected. The gift request processing unit 61d of the server device 60 cause the wear object 138 representing the earrings corresponding to the display instruction object 42d to be displayed in the co-performing video being distributed. Since "ears" are designated as the worn-on portion for the wear object 138 representing the earrings, the wear object 138 is worn on the ears of the character object 31. Examples of a view of the video that includes the character object 31 wearing the wear object 31 that represents the earrings are shown in FIGS. 10, 11A to 11B. Further, as shown in FIGS. 11A and 11B, the selected display instruction object 42b may be removed from the view 330. Alternatively when the display instruction object 42d has been selected by the distributor user Ub, the display instruction object 42d does not have to be removed from the view 330. In this case, the distributor user Ua who appear together in the co-performing video is also able to select the display instruction object 42d. When the display instruction object 42d is selected by the distributor user Ua, the character 131 of the distributor user Ua wears the wear object 138. When the display instruction object 42d is selected by one of the distributor user Ua and the distributor user Ub who appear together in the video, the display instruction object 42d is removed from the view on the screen of the distributor user device of the distributor user who made the selection. Whereas in the view on the screen of the distributor user device of the distributor user who did not make the selection, the display instruction object 42d may be continuously displayed. For example, when the distributor user Ub selected the display instruction object 42d and the distributor user Ua does not select the display instruction object 42d, the display instruction object 42d may be removed from the view 330 on the screen of the distributor user device 20b of the distributor user Ub and the display instruction object 42d may remain displayed in the view 330 on the screen of the distributor user device 20a of the distributor user Ua. In this manner, after the distributor user Ub has selected the object, the distributor user Ua may select the display instruction object 42d to cause his/her character object 131 to wear the wear object 138.

Figure 12:
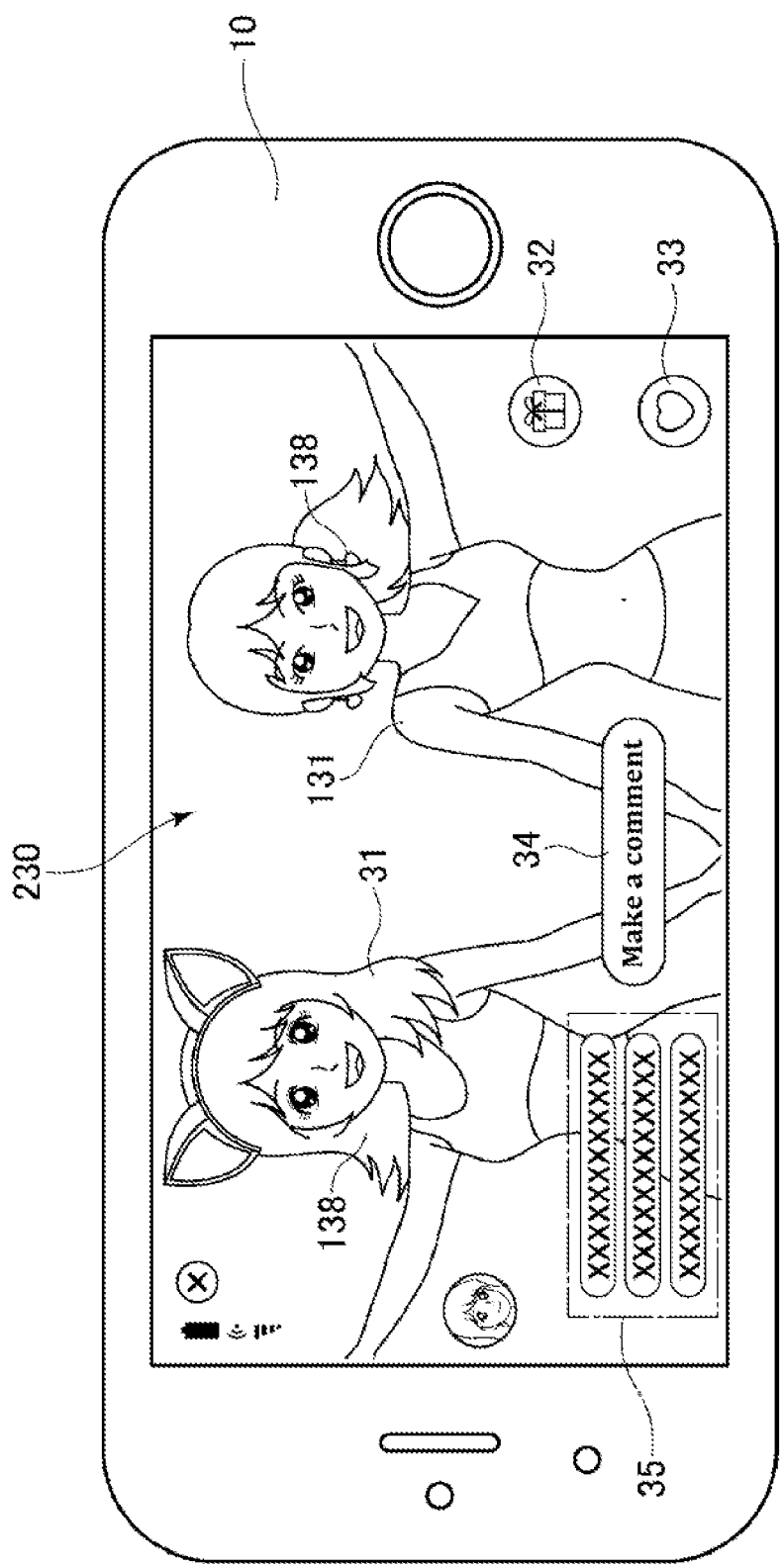
FIG. 12 illustrates an example of a view of the co-performing video displayed on the viewer user device 10 in one embodiment. In the view of FIG. 12, a character object 131 wears a wear object 138.
Figure 13B:
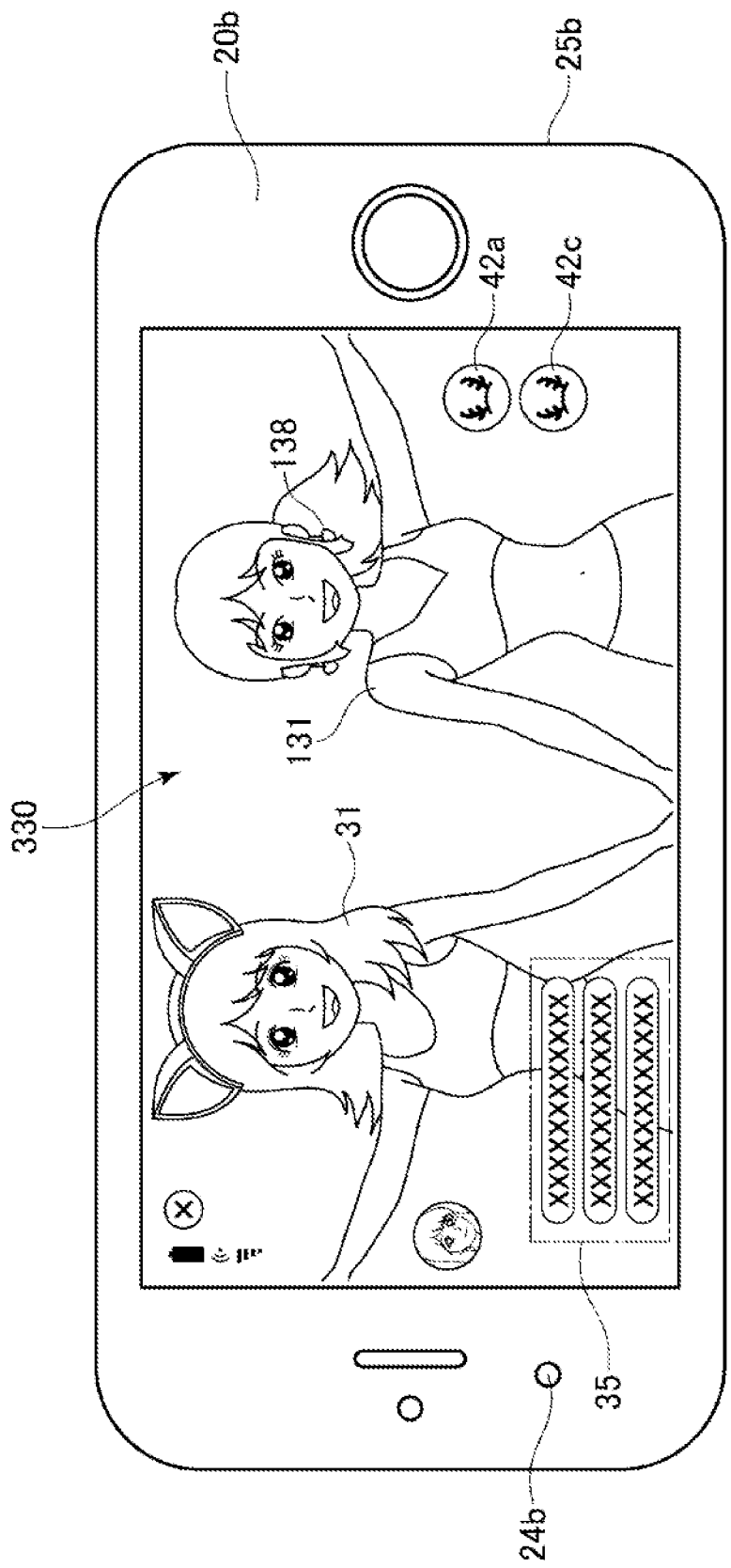
FIG. 13B illustrates an example of a view of the co-performing video displayed on the distributor user device 20b in one embodiment. In the view of FIG. 13B, the character object 131 wears the wear object 138.

When the display instruction object 42d is selected by the distributor user Ub, the distributor user device 20b notifies the server device 60 that the display instruction object 42d has been selected. The gift request processing unit 61d of the server device 60 generates the co-performing video in which the wear object 138 representing the earrings corresponding to the display instruction object 42d to be worn by the character 131 of the distributor user Ua. Examples of a view of the video that includes the character object 31 wearing the wear object 31 that represents the earrings are shown in FIGS. 12, 13A to 13B.

When the distributor user Ua and the distributor user Ub appear together in the co-performing video, the display instruction object (for example, the display instruction objects 42a to 42d) for displaying the wear gift is displayed on at least one of the distributor user device 20a of the user Ua and the distributor user device 20b of the distributor user Ub. In the embodiment shown in FIGS. 9A and 9B, the display instruction objects 42a, 42c, and 42d are displayed on both the distributor user device 20a and the distributor user device 20b. In this case, both the distributor user Ua and the distributor user Ub are able to select the display instruction objects 42a, 42c, and 42d. In one embodiment, when one of the distributor user Ua and the distributor user Ub selects the displayed display instruction object, the other user becomes unable to select the selected display instruction object. For example, as shown in FIGS. 11A and 11B, when the display instruction object 42d is selected by the distributor user Ub, the display instruction object 42d displayed in the view 330 on the distributor user device 20b of the distributor user Ub is removed, and the display instruction object 42d is also deleted from the view 330 displayed on the distributor user device 20a of the distributor user Ua. Thus, after the display instruction object 42d has been selected by the distributor user Ub, the display instruction object 42d becomes unselectable by the distributor user Ua who appears together in the co-performing video. On the contrary, after the display instruction object 42d has been selected by the distributor user Ua, the display instruction object 42d becomes unselectable by the distributor user Ub who appears together in the co-performing video.

In other embodiment, when the viewer user gives the wear gift, the viewer user is able to specify which of the co-performing distributor users in the co-performing video is to be given the gift. More specifically, the viewer user is able to specify, in the first display request for displaying the wear gift, to which of the co-performing distributor users in the co-performing video the wear gift is given. For example, in the embodiments shown in FIGS. 8 and 9A to 9B, the user who is viewing the co-performing image shown in FIG. 8 is able to select the gift button 32 to select the wear gift as a gift and further is able to select the distributor user Ua or the distributor user Ub as a gifting destination of the wear gift. When the gift button 32 is selected, icons for identifying the distributor user Ua and the distributor user Ub may be displayed in the view, and either the distributor user Ua or the distributor user Ub may be specified as the gifting destination by selecting a corresponding one of the icons. The selection of the distributor user Ua or the distributor user Ub may be made by selecting the character object 131 or character object 31 respectively. When the distributor user Ub (character object 31) is designated in the display request for the wear gift indicating the earrings described above, the display instruction object 42d corresponding to the wear gift is displayed in the view on the distributor user device 20b of the distributor user Ub and may not be displayed in the view on the distributor user device 20a of the distributor user Ua who was not designated in the display request. In other embodiment, when the distributor user Ub (character object 31) is specified in the display request for the wear gift representing the earrings, the display instruction object 42d corresponding to the wear gift may be displayed in the views on both the user device 20a of the distributor user Ua and the distributor user device 20b of the distributor user Ub but the display instruction object 42d may be made unselectable from the distributor user device 20a of the undesignated distributor user Ua. As described above, when the gifting destination is specified in the display request of the wear gift, the display instruction object for the wear gift is made selectable on the distributor user device(s) of the specified distributor user(s) and made unselectable on the distributor user device(s) of the distributor user(s) other than the specified user(s).

In other embodiment, the display instruction object may be made selectable only in the distributor user device of the distributor user who has distributed the video that is the source of the co-performing video. In the examples of FIGS. 8 and 9A to 9B, the distributor user Ua has made the co-performing request for the video originally distributed by the distributor user Ub so that the display instruction objects 42a, 42c, and 42d are made selectable on the distributor user device 20b of the distributor user Ub whereas they are made unselectable on the distributor user device 20a of the distributor user Ua. For example, the display instruction objects 42a, 42c, and 42d may be displayed on the distributor user device 20b, but may not be displayed on the distributor user device 20a of the distributor user Ua.

When the co-performing distributor user selects the display instruction object to display the wear gift, the co-performing distributor user may specify the character object who wear the selected gift. For example, when the distributor user Ub selects the display instruction object 42d to display the wear gift 138 in the co-performing video, the wear gift may be worn by its own character object 31 or the character 131 of the co-performing distributor user Ua. For example, when the display instruction object 42d is selected in the distributor user device 20b, options to choose the character object may be displayed in the distributor user device 20b.

Figure 14:
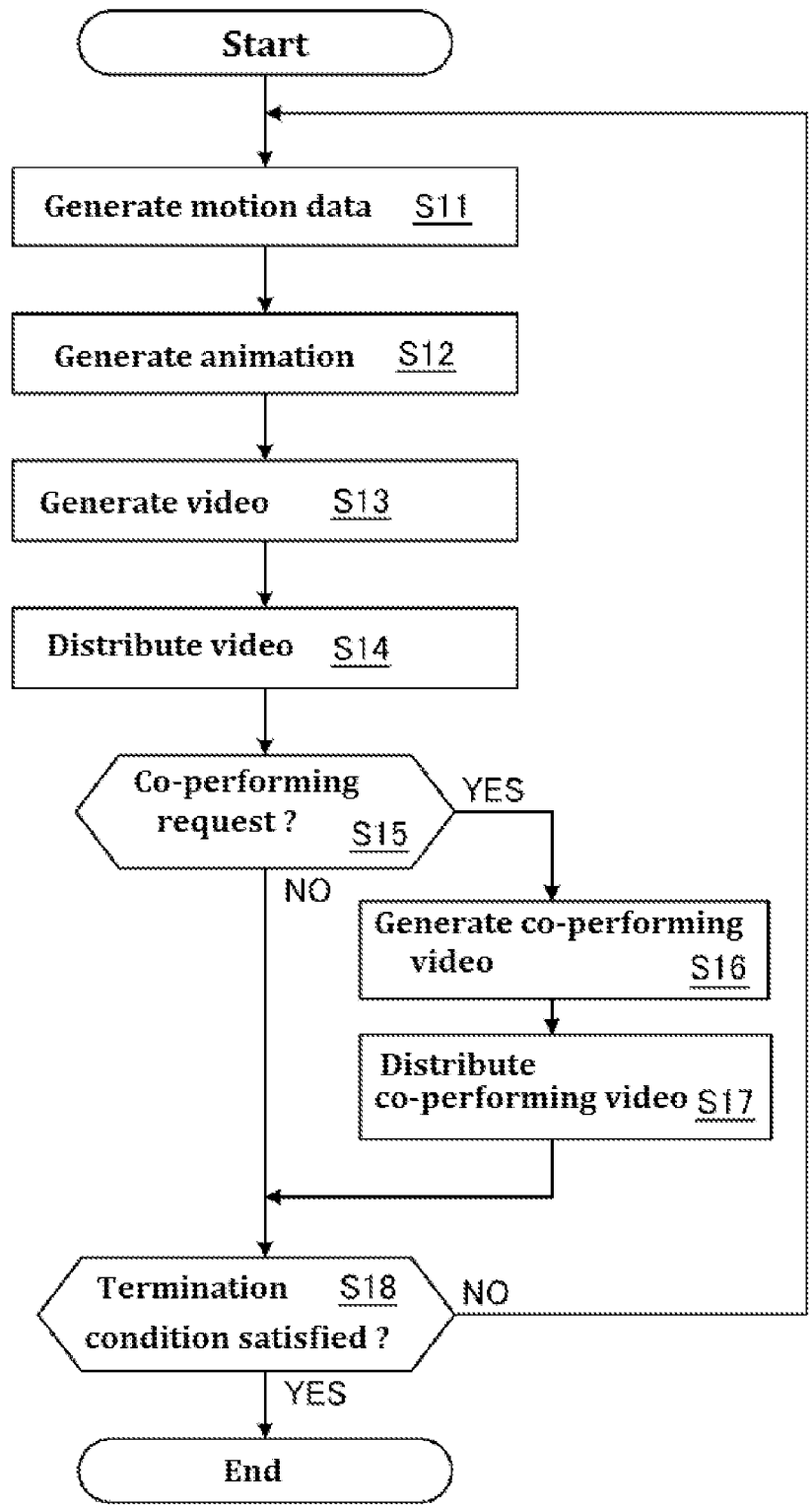
FIG. 14 is a flow chart showing a flow of a video distribution process in one embodiment.
Figure 15:
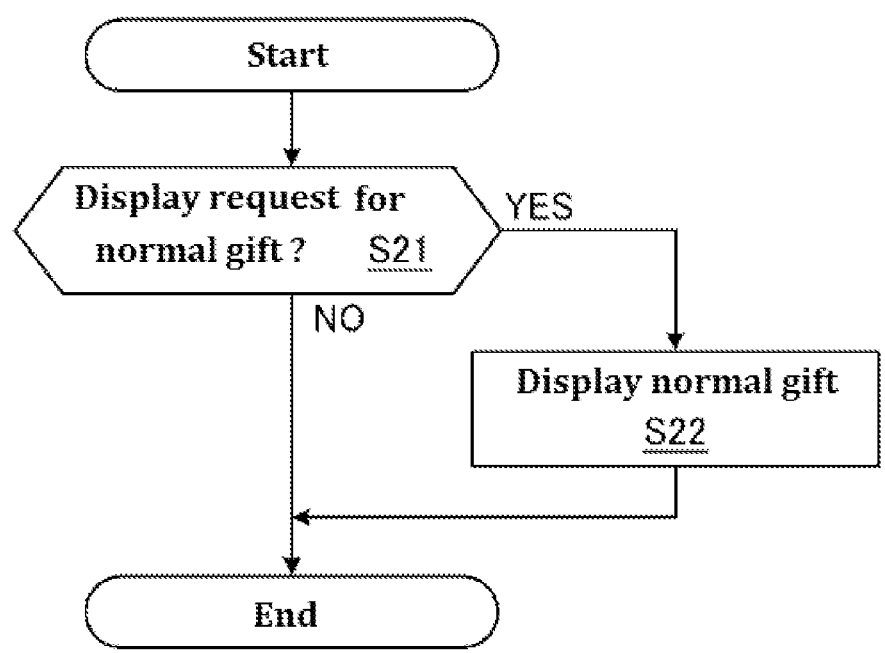
FIG. 15 is a flowchart of a process for displaying a normal gift in one embodiment.
Figure 16:
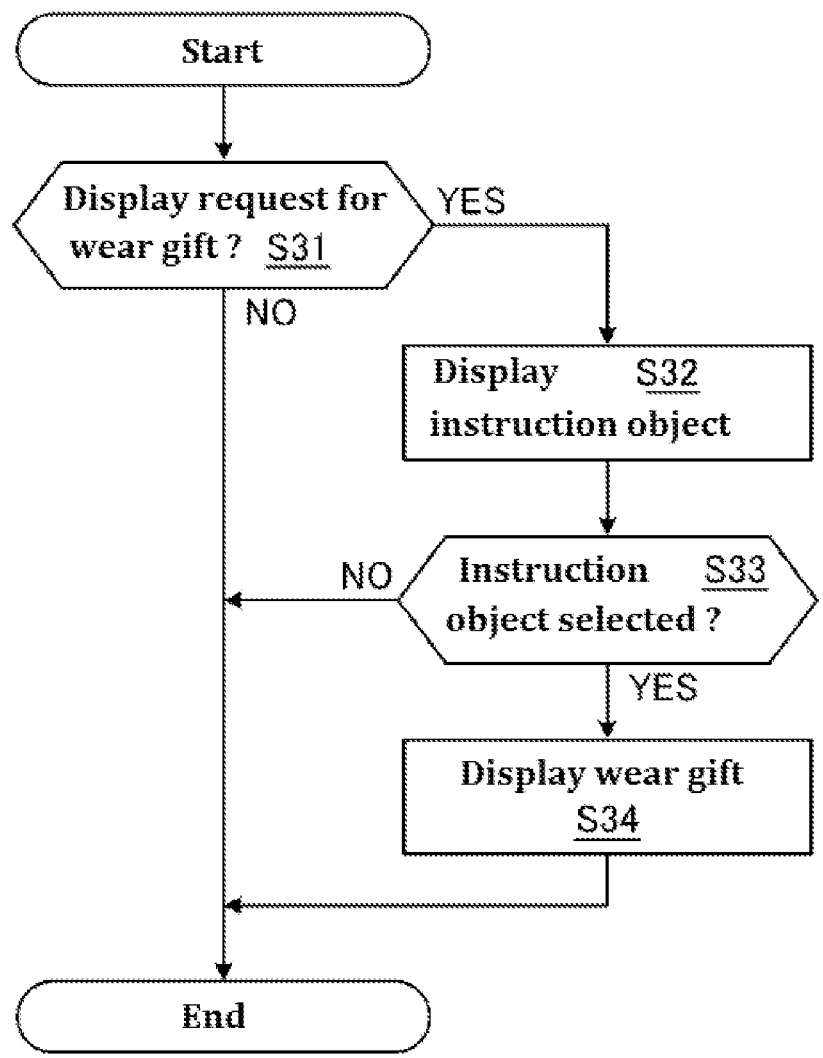
FIG. 16 is a flowchart of a process for displaying a wear gift in one embodiment.

Next, with reference to FIGS. 14 to 16, a video distribution process in one embodiment will be described. FIG. 14 is a flow chart showing a flow of a video distribution process in one embodiment, FIG. 15 is a flowchart of a process for displaying a normal object according to one embodiment, and FIG. 16 is a flowchart of a process for displaying a wear object according to one embodiment. In the video distribution process described with reference to FIGS. 14 to 16, it is assumed that a video generated based on the face motion data obtained by the distributor user Ub using the distributor user device 20b is being distributed and the co-performing request is made by the distributor user Ua who is watching the video.

In step S11, the face motion data, which is a digital representation of the movement (expression) of the face of the distributor user Ub, is generated. The generation of the face motion data is performed, for example, by the face motion data generation unit 211a in the distributor user device 20. In the distributor user device 20, the voice data may be generated based on voice input by the distributor user Ub. The generated face motion data and voice data are transmitted to the server device 60.

In step S12, the face motion data from the distributor user device 20 is applied to model data for the distributor user Ub to generate animation of the character object that moves in synchronization with the facial movement (expression) of the distributor user Ub. The generation of the animation is performed, for example, by the above-described animation generation unit 61a.

In step S13, a video including the animation of the character object corresponding to the distributor user Ub is generated. The voice of the distributor user Ub may be included in the video. The animation of the character object is displayed superimposed on the background image. Generation of the video is performed, for example, by the above-described video generation unit 61b.

Next, the process proceeds to step S14 where the video generated in step S13 is distributed. The video is distributed to the viewer user device 10 and other viewer user devices and the distributor user device over the network 50. The video is distributed continuously over a predetermined distribution period. The distribution period of the video may be set to, for example, 30 seconds, 1 minute, 5 minutes, 10 minutes, 30 minutes, 60 minutes, 120 minutes, and any other length of time. The video distributed in this way is not a co-performing video because it does not include a character object corresponding to a guest user. In the video distributed in step S14, the display mode of the wear object may be set to the automatic wear mode.

Subsequently, in step S15, it is determined whether a co-performing request has been made by a user other than the distributor user Ub. The co-performing request is made, for example, by the distributor user Ua. When the co-performing request is made by the distributor user Ua, the process proceeds to step S16. In step S16, an animation of the character object 131 of the distributor user Ua is generated based on the face motion data of the distributor user Ua. Then, a co-performing video is generated by adding the animation of the character object 131 of the distributor user Ua to the video being distributed (the video including the character object 31 of the distributor user Ub). In the co-performing video distributed in step S16, the display mode of the wear object may be set to the manual wear mode. That is, the display mode of the wear object may be set to the automatic wear mode before the co-performance starts, and may be switched to the manual wear mode when the co-performance is started. The processing in step S16 is performed, for example, by the co-performing request processing unit 61f described above.

Next, the process proceeds to step S17 where the video generated in step S16 is distributed. The co-performing video is distributed to the viewer user device 10 and other viewer user devices and the distributor user device over the network 50. The co-performing video includes, for example, the animation of the character object 131 of the distributor user Ua and the animation of the character object 31 of the distributor user Ub, as shown in FIGS. 8, 9A and 9B. Before the co-performing processing in step S16, the game start button may be displayed on the distributor user device 20b of the distributor user Ub. When showing the co-performing video on the distributor user device 20b of the distributor user Ub, the game start button may be disabled in the distributor user device 20b. Disabling the game start button means not accepting the selection of the game start button. The game start button may be disabled by not displaying the game start button or not accepting an operation on the shown game start button. In this way, it is possible to prevent the co-performing video being distributed from being switched to a game image through an operation by the distributor user Ub, which is the host user. Switching the co-performing video to the game image during distribution of the co-performing video by the operation of the host user means interruption of the distribution of the video for a guest user who is co-performing in the video. By disabling the game start button on the distributor user device of the host user during the distribution of the co-performing video, it is possible to prevent the occurrence of such a disadvantageous situation for the guest user that the distribution of the co-performing video is interrupted.

Subsequently in step S18, it is determined whether a termination condition for ending the distribution of the video is satisfied. The termination condition is, for example, that the distribution ending time has come, that the distributor user Ub performed a distribution ending operation on the distributor user device 20 to end the distribution, or any other conditions. If the termination condition is not satisfied, the steps S11 to S17 of the process are repeatedly executed, accordingly distribution of the video that includes the animation synchronized with the motion of the distributor user U1 is continued or distribution of the co-performing video is continued when the co-performance is on-going. When it is determined that the termination condition is satisfied for the video, the distribution process of the video is ended.

Next, with further reference to FIG. 15, a description is given of the display process of the normal gift object that is performed while a video is live-distributed. The display process of the normal gift object is performed in parallel with the distribution process of the video shown in FIG. 14.

In step S21, it is determined whether a display request for the normal gift object has been made while the video is live-distributed. For example, a viewer user may select one or more specific normal gift objects from among the normal gift objects that the viewer user possesses and send a display request to display the selected normal gift object(s) from the viewer user device 10 to the server device 60. As described above, a display request for a specific normal gift object may be generated in response to completion of the purchase process or the payment process of the normal gift object.

When the display request for the normal gift object has been made, the display process proceeds to step S22. Step S22 is a process for displaying in the video being distributed the normal gift object for which the display request has been made, based on the display request. For example, when the display request for the normal gift object has been made while a predetermined video is live-distributed, the normal objects 37a, 37b corresponding to the normal gifts for which the display requests have been made are displayed on the view 30 on the screen of the viewer user device 10 as shown in FIG. 5.

When no display request is made for the normal gift object, the display request for the normal gift object is ended. The display process of the normal gift object shown in FIG. 15 is performed repeatedly in the distribution period of the video. The display process of the effect object is performed by the same procedure as described above for the normal gift object.

Next, with further reference to FIG. 16, a description is given of a display process of the wear gift object that is performed while a video is live-distributed. The display process of the wear gift object is performed in parallel with the distribution process of the video shown in FIG. 14. It is also possible that the display process of the wear object is performed in parallel with the display process of the normal gift object shown in FIG. 15.

In step S31, it is determined whether a display request for the wear gift object has been made while the video is live-distributed. For example, a first viewer user may transmit a display request to display the wear gift that the viewer user possesses from the viewer user device 10 to the server device 60.

When the display request for the wear gift has been made, the display process proceeds to step S32. In step S32, the display instruction object associated with the wear gift for which the display request has been made is displayed on the view 40 of the distributor user device 20 based on the display request. For example, when a display request for the wear gift representing a headband is made, the display instruction object 42*b* associated with the wear gift is displayed on the view 40 of the distributor user device 20.

Next, in step S33, it is determined whether a specific display instruction object has been selected from among the display instruction objects included in the view 40 of the distributor user device 20.

When the specific display instruction object has been selected, in step S34, the process for displaying the wear gift corresponding to the selected specific display instruction object in the view of the live-distributed video. For example, when the display instruction object 42*b* included in the view 40 is selected, the wear object 38 associated with the selected display instruction object 42*b* is displayed in the view 30 and the view 40 as shown in Figs.6, 7A and 7B. Subsequently the selected display instruction object 42*b* is removed from the view 40.

When any display instruction object is not selected in step S33 or the display process of the wear gift is completed in step S34, the display process of the wear gift is ended.

According to the above embodiment, when the viewer user watching the co-performing video makes the first display request to display the wear gift, the wear gift is not immediately displayed in the co-performing video, but is displayed in response to the selection of the display instruction objects 42*a* to 42*d* by the distributor user Ua or the distributor user Ua. Thus, even if a large amount of wear gifts are given by the viewer users watching the co-performing video, it is possible to arrange the corresponding wear objects in an orderly manner in the co-performing video. Therefore, the viewing experience of the viewer users can be prevented from being deteriorated. According to the above embodiment, the wear gift is worn by only one of the character objects of the distributor user Ua and the distributor user Ub who appear together in the co-performing video. In this case, the number of wear objects displayed in the co-performing video can be reduced so that the wear objects can be displayed more orderly in the co-performing video.

According to the above embodiment, the display instruction object is displayed on both the distributor user device 20*a* of the distributor user Ua and the distributor user device 20*b* of the distributor user Ub. Thus, the distributor user Ua who has made the co-performing request is also given an opportunity to wear the given wear gift in the co-performing video. By making the co-performing request to the distributor user Ub who collects a lot of gifts, the distributor user Ua is able to have an opportunity to wear a lot of wear gifts. The distributor user tends to wish attractive decorations on his/her character object. As described above, it is possible to give the distributor user Ua a motivation to make the co-performing request according to the above embodiment.

According to the above embodiment, the viewer user can specify the gifting destination of the wear object. Therefore, the wear gift can be given to the intended distributor user without being stolen by the co-performing distributor user.

According to the above embodiment, the display instruction object is displayed only on the distributor user device 20*b* of the distributor user (for example, the distributor user Ub) who has originally distributed the video. Although two or more distributor users appear together in the co-performing video, it is preferable that the distributor user who has distributed the original video manage the co-performing video. According to this embodiment, it is possible to entrust the decision as to whether to display the wear gift to the distributor user who has distributed the original video, not the co-performing distributor user who made the co-performing request.

The display time of the normal gifts 37*a* and 37*b* may be set shorter than that of the wear gift 38, and the normal objects 37*a* and 37*b* may be displayed such that they are not in contact with the character object 31 or behind the character object 31 instead of in front of the character object 31. In this case, the visibility of the character object 31 in the live distributed video is less affected by the normal objects 37*a* and 37*b*. Thus, even when the normal gifts are automatically displayed in the video in response to display requests from the viewer users (without permission from the distributor users Ua and Ub), it does not immediately lead to deterioration of the viewing experience of the user caused by the deterioration of the visibility of the character object 31.

In the above embodiment, it is presumed that viewer watching videos that include character objects such as the character object 31 are fond of these character objects. Therefore, it is possible to enhance the satisfaction of the viewer users who provided the wear gifts since the appearance of the character objects can be improved by dressing the character objects with the wear gifts rather than the effect gifts or the normal gifts. Thus, the wear objects that can be attached to the character objects induces the users to repeatedly view the video including the character objects.

In the video distribution system 1 in the above embodiment, a user is able to present a character with a wear object. Thus, it is possible to provide the system having higher originality and to provide service having higher originality using such a system, as compared to systems in which presenting a wear object is not allowed. As a result, it is possible to attract users with the video distribution system 1 and to increase the number of times the users view videos in the video distribution system 1.

In the video distribution system 1 according to the above-described embodiment, the distributor users Ua and Ub are each able to distribute a video including a character object that moves in accordance with his/her facial expression using the distributor user device 20 provided with a camera such as a smartphone.

As described above, in the video distribution system 1, the equipment necessary for distributing a video by the distributor users Ua and Ub is simplified, so realized is a platform in which the distributor users Ua and Ub can easily participate.

The procedures described herein, particularly those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present invention.

At least some of the functions that can be realized by the computer processor 61 may be realized by a computer processor other than the computer processor 61 of the video distribution system 1. At least one of the functions that are realized by the computer processor 21 may be realized by the computer processor 21 in the distributor user device 20 or a computer processor of the viewer user device 10. More specifically, some or all of the functions of the animation generation unit 61*a* and the video generation unit 61*b* may be executed by the distributor user device 20. For example, a video generated by the distributor user device 20 may be transmitted to the server device 60 and distributed from the server device 60 to the viewer user device 10.

When the distributor user Ua watching the video that includes the character object 31 of the distributor user Ub makes the co-performing request to the distributor user Ub, the animation of the character object 131 of the distributor user Ua who has made the co-performing request may be generated by the server device 60, the distributor user device 20*a* of the distributor user Ua, the distributor user device 20*b* of the distributor user Ub, the viewer user device 10, or any other devices. In one example, when the animation of the character object 131 of the distributor user Ua is generated by the distributor user device 20*b* of the distributor user Ub, the face motion data and the voice data of the distributor user Ua are transmitted from the distributor user device 20*a* of the distributor user Ua to the distributor user device 20*b* of the distributor user Ub. In the distributor user device 20*b*, the animation of the character object 131 is generated by applying the face motion data and the voice data of the distributor user Ua received from the distributor user device 20*a* to the model data for the distributor user Ua. The model data for the distributor user Ua may be transmitted from the server device 60 to the distributor user device 20*a*. In another example, when the animation of the character object 131 of the distributor user Ua is generated by the viewer user device 10, the face motion data and the voice data of the distributor user Ua are transmitted from the distributor user device 20*a* of the distributor user Ua to the viewer user device 10, and the face motion data and the voice data of the distributor user Ub are transmitted from the distributor user device 20*b* of the distributor user Ub to the viewer user device 10. In the viewer user device 10, the animation of the character object 131 may be generated by applying the face motion data and the voice data of the distributor user Ua received from the distributor user device 20*a* to the model data for the distributor user Ua, and the animation of the character object 31 may be generated by applying the face motion data and voice data of the distributor user Ub received from the distributor user device 20*b* to the model data for the distributor user Ub. The model data for the distributor user Ua and the model data for the distributor user Ub may be transmitted from the server device 60 to the distributor user device 10. As described above, the animation of the character object of the distributor user may be generated by any device included in the video distribution system 1. The animation of the character object may be generated by a device not explicitly shown in FIG. 1. The face motion data and voice data of the distributor user Ua are transmitted from the distributor user device 20*a* of the distributor user Ua to the device that generates the animation of the character object, and the face motion data and voice data of the distributor user Ub is transmitted from the distributor user device 20*b* of the distributor user Ub to the device that generates the animation of the character object. The body motion data may be transmitted in addition to the face motion data.

Further, the generation of the co-performing video that includes the generated character object 131 of the distributor user Ua and the character object 31 of the distributor user Ub may be performed by any of the server device 60, the distributor user device 20*a* of the distributor user Ua, and the distributor user Ub, the user device 20*b* or the viewer user device 10.

The co-performing video may include character objects of three or more distributor users. That is, three or more distributor users may virtually appear in a video using each character object.

LIST OF REFERENCE NUMBERS

1 video distribution system

What is claimed is:

1. A system, comprising:
one or more computer processors, wherein the one or more computer processors execute computer-readable instructions to:
distribute data for causing a plurality of viewer user devices to play a co-performing video, each of the viewer user devices being used by a corresponding one of a plurality of viewer users, the co-performing video including (i) a first character object generated based on one or more motions of a first user and (ii) a second character object generated based on one or more motions of a second user, the first user and the second user are different from the plurality of viewer users;
in response to receiving a first display request for a first gift from a first viewer user device of the plurality of viewer user devices, display a display instruction object on at least one of a first user device used by the first user or a second user device used by the second user, the first user device and the second user device are different from the plurality of viewer user devices; and
in response to an operation selecting the display instruction object, display the first gift in association with at least one of the first character object or the second character object in the co-performing video,
wherein the one or more computer processors execute the computer-readable instructions further to, in response to receiving a second display request for a second gift from a second viewer user device of the plurality of viewer user devices, display another display instruction object on at least one of the first user device or the second user device; and
wherein the second gift is not displayed in the co-performing video without operation selecting the other display instruction object.

2. The system of claim 1, wherein:
the display instruction object is displayed on both of the first user device and the second user device,
the display instruction object is made unselectable from the second user device responsive to selection of the display instruction object by the first user device, and
the display instruction object is made unselectable from the first user device responsive to selection of the display instruction object by the second user device.

3. The system of claim 1, wherein:
the first display request includes user specifying information specifying either the first user or the second user, when the first user is specified by the user specifying information, the display instruction object is made selectable on the first user device and the display instruction object is made unselectable on the second user device, and when the second user is specified by the user specifying information, the display instruction object is made selectable on the second user device and the display instruction object is made unselectable on the first user device.

4. The system of claim 1, wherein the display instruction object is made selectable on the first user device, and the display instruction object is made unselectable in the second user device.

5. The system of claim 4, wherein in response to detecting an operation on the first user device selecting the display instruction object, the first gift is displayed in association with the second character object in the co-performing video.

6. The system of claim 1, wherein:
the first gift is a wear gift associated with a worn-on portion of the first character object and the second character object, and
the wear gift is displayed in the co-performing video at a position corresponding to the worn-on portion in response to the operation selecting the display instruction object.

7. The system of claim 1, wherein a third gift is displayed in the co-performing video in response to receiving a third display request from a third viewer user device of the plurality of viewer user devices for the third gift that is displayed without being associated with a specific portion of the first character object or the second character object.

8. The system of claim 1, wherein the co-performing video is generated based on a co-performing request from the second user.

9. The system of claim 1, wherein in response to the operation selecting the display instruction object, the first gift is displayed in association with only one of the first character object or the second character object in the co-performing video.

10. The system of claim 1, wherein the one or more computer processors execute the computer-readable instructions further to:
distribute a non-co-performing video including the first character object and not including the second character object,
wherein in response to receiving the first display request for the first gift from a viewer user viewing the non-co-performing video, the first gift is displayed in association with the first character object without the operation selecting the display instruction object.

11. The system of claim 1, wherein
a game start button for starting a game is displayed on the first user device when a non-co-performing video that includes the first character object but does not include the second character object is distributed, and
the game start button is made unselectable on the first user device when the co-performing video is distributed.

12. The system of claim 1, wherein the one or more computer processors execute the computer-readable instructions further to:
obtain, from the first user device, first face motion data representative of facial movement of the first user; and
obtain, from the second user device, second face motion data representative of facial movement of the second user, wherein:
the one or more motions of the first user are determined based on the first face motion data, and
the one or more motions of the second user are determined based on the second face motion data.

13. The system of claim 1, wherein the one or more computer processors execute the computer-readable instructions further to:
obtain, from the first user device, first body motion data representative of body movement of the first user; and
obtain, from the second user device, second body motion data representative of body movement of the second user, wherein:
the one or more motions of the first user are determined based on the first body motion data, and
the one or more motions of the second user are determined based on the second body motion data.

14. The system of claim 1, wherein the first gift is not displayed in the co-performing video in association with at least one of the first character object or the second character object until the operation selecting the display instruction object.

15. A method performed by executing computer readable instructions by one or more computer processor, comprising:
distributing, to a plurality of viewer user devices, data for causing the plurality of viewer user devices to play a co-performing video including (i) a first character object generated based on one or more motions of a first user and (ii) a second character object generated based on one or more motions of a second user, the first user and the second user are different from the plurality of viewer users;
in response to receiving a first display request for a first gift from a first viewer user device of the plurality of viewer user devices, causing a display instruction object to be displayed on at least one of a first user device used by the first user or a second user device used by the second user, the first user device and the second user device are different from the plurality of viewer user devices;
in response to an operation selecting the display instruction object, causing the first gift to be displayed in association with at least one of the first character object or the second character object in the co-performing video, and
in response to receiving a second display request for a second gift from a second viewer user device of the plurality of viewer user devices, causing another display instruction object to be displayed on at least one of the first user device or the second user device,
wherein the second gift is not displayed in the co-performing video without operation selecting the other display instruction object.

16. A non-transitory computer-readable storage medium storing program that, when executed by one or more computer processors effectuate operations comprising:
distributing, to a plurality of viewer user devices, data for causing the plurality of viewer user devices to play a co-performing video including (i) a first character object generated based on one or more motions of a first user and (ii) a second character object generated based on one or more motions of a second user, the first user and the second user are different from the plurality of viewer users;
in response to receiving a first display request for a first gift from a first viewer user device of the plurality of viewer user devices, displaying a display instruction object on at least one of a first user device used by the first user or a second user device used by the second user, the first user device and the second user device are different from the plurality of viewer user devices;

in response to an operation selecting the display instruction object, displaying the first gift in association with at least one of the first character object or the second character object in the co-performing video, and in response to receiving a second display request for a second gift from a second viewer user device of the plurality of viewer user devices, displaying another display instruction object on at least one of the first user device or the second user device, wherein the second gift is not displayed in the co-performing video without operation selecting the other display instruction object.

* * * * *